(12) United States Patent
Dickerson et al.

(10) Patent No.: US 12,229,213 B2
(45) Date of Patent: Feb. 18, 2025

(54) WEBSITE CREATION SYSTEM FOR CREATING WEBSITES HAVING AT LEAST ONE SERIES OF DIRECTIONAL WEBPAGES AND RELATED METHODS

(71) Applicant: Etison LLC, Eagle, ID (US)

(72) Inventors: Todd Dickerson, Cranton, GA (US); Russell Brunson, Eagle, ID (US); Ryan Montgomery, Belmont, MI (US)

(73) Assignee: ETISON LLC, Eagle, ID (US)

( * ) Notice: Subject to any disclaimer, the term of this patent is extended or adjusted under 35 U.S.C. 154(b) by 0 days.

(21) Appl. No.: 17/304,159

(22) Filed: Jun. 15, 2021

(65) Prior Publication Data
US 2021/0303654 A1   Sep. 30, 2021

Related U.S. Application Data

(63) Continuation of application No. 15/880,255, filed on Jan. 25, 2018, now Pat. No. 11,068,559.

(51) Int. Cl.
*G06F 16/958*   (2019.01)
*G06F 3/0481*   (2022.01)
(Continued)

(52) U.S. Cl.
CPC .......... *G06F 16/972* (2019.01); *G06F 3/0481* (2013.01); *G06F 16/951* (2019.01); *G06F 40/186* (2020.01)

(58) Field of Classification Search
CPC .... G06F 16/972; G06F 16/951; G06F 40/186; G06F 3/0481
See application file for complete search history.

(56) References Cited

U.S. PATENT DOCUMENTS 5,732,219 A * 3/1998 Blumer ............ G06F 40/166
 709/227
5,793,966 A * 8/1998 Amstein ............ G06F 16/958
 707/E17.116
(Continued)

FOREIGN PATENT DOCUMENTS

CN    102999527 A    3/2013
KR 10-2006-0014233 A  2/2006
(Continued)

OTHER PUBLICATIONS

International Search Report for PCT Application No. PCT/US2019/014602, mailed May 1, 2019, 3 pages.
(Continued)

*Primary Examiner* — Nicholas Augustine
(74) *Attorney, Agent, or Firm* — Angela Holt; Bradley Arant Boult Cummings LLP

(57) ABSTRACT

The present disclosure is directed toward systems and methods for creating a website and response actions via a website creation system. The systems and methods provide a plurality of website types for selection, and in response to receiving a selection of a website type, provide a plurality of website templates specific to the selected website type. Each website type may include a series of directional webpages designed and intended to entice a particular user interaction with the website. Additionally, the systems and methods receive a selection of a type of response action, a selection of at least one rule of a triggering condition, and an operand for the at least one rule of the triggering condition. Moreover, in response to the event of the triggering condition, the systems and method perform the response action.

12 Claims, 33 Drawing Sheets

(51) Int. Cl.
*G06F 16/951* (2019.01)
*G06F 40/186* (2020.01)
*G06F 16/95* (2019.01)

(56) References Cited

U.S. PATENT DOCUMENTS

| | | | |
|---|---|---|---|
| 6,178,432 B1 * | 1/2001 | Cook | G06F 16/95 |
| | | | 715/201 |
| 6,185,587 B1 | 2/2001 | Bernardo et al. | |
| 6,275,833 B1 * | 8/2001 | Nakamura | G06F 16/9577 |
| | | | 709/219 |
| 6,421,717 B1 * | 7/2002 | Kloba | G06F 16/9577 |
| | | | 719/329 |
| 7,194,678 B1 | 3/2007 | Koike et al. | |
| 7,458,021 B2 | 11/2008 | Balasubramanyan et al. | |
| 8,799,829 B2 | 8/2014 | Grosz et al. | |
| 2002/0138562 A1 * | 9/2002 | Wies | G06F 3/016 |
| | | | 709/203 |
| 2002/0194194 A1 * | 12/2002 | Fenton | H04N 21/2743 |
| 2003/0233425 A1 | 12/2003 | Lyons et al. | |
| 2008/0072139 A1 | 3/2008 | Salinas et al. | |
| 2008/0263135 A1 | 10/2008 | Olliphant | |
| 2008/0307385 A1 * | 12/2008 | Dreiling | G06F 8/38 |
| | | | 717/108 |
| 2011/0161178 A1 | 6/2011 | Rosenstein et al. | |
| 2012/0151329 A1 | 6/2012 | Cordasco | |
| 2013/0055071 A1 | 2/2013 | Bray | |
| 2013/0066729 A1 * | 3/2013 | DiStefano, III | G06Q 30/0256 |
| | | | 705/14.73 |
| 2013/0117151 A1 | 5/2013 | Macaisa et al. | |
| 2014/0075385 A1 | 3/2014 | Wan et al. | |
| 2014/0143252 A1 | 5/2014 | Silverstein et al. | |
| 2015/0120357 A1 | 4/2015 | Tuchman et al. | |
| 2015/0317750 A1 | 11/2015 | Benhuri | |
| 2016/0196244 A1 * | 7/2016 | Greenberg | G06F 40/143 |
| | | | 715/205 |
| 2016/0357527 A1 * | 12/2016 | Geva | G06F 8/38 |
| 2017/0115829 A1 * | 4/2017 | Al-Alami | G06Q 10/06 |
| 2017/0116581 A1 | 4/2017 | Shah et al. | |
| 2017/0147364 A1 | 5/2017 | Shaposhnikov | |
| 2017/0315969 A1 * | 11/2017 | Ben-Aharon | G06F 40/186 |
| 2020/0334709 A1 * | 10/2020 | Ma | G06N 20/00 |
| 2022/0237255 A1 * | 7/2022 | Koren | G06Q 10/101 |

FOREIGN PATENT DOCUMENTS

KR 10-2007-0118753 A 12/2007
WO 2015/172228 A1 11/2015

OTHER PUBLICATIONS

International Written Opinion of the International Searching Authority for PCT Application No. PCT/US2019/014602, mailed May 1, 2019, 7 pages.

* cited by examiner

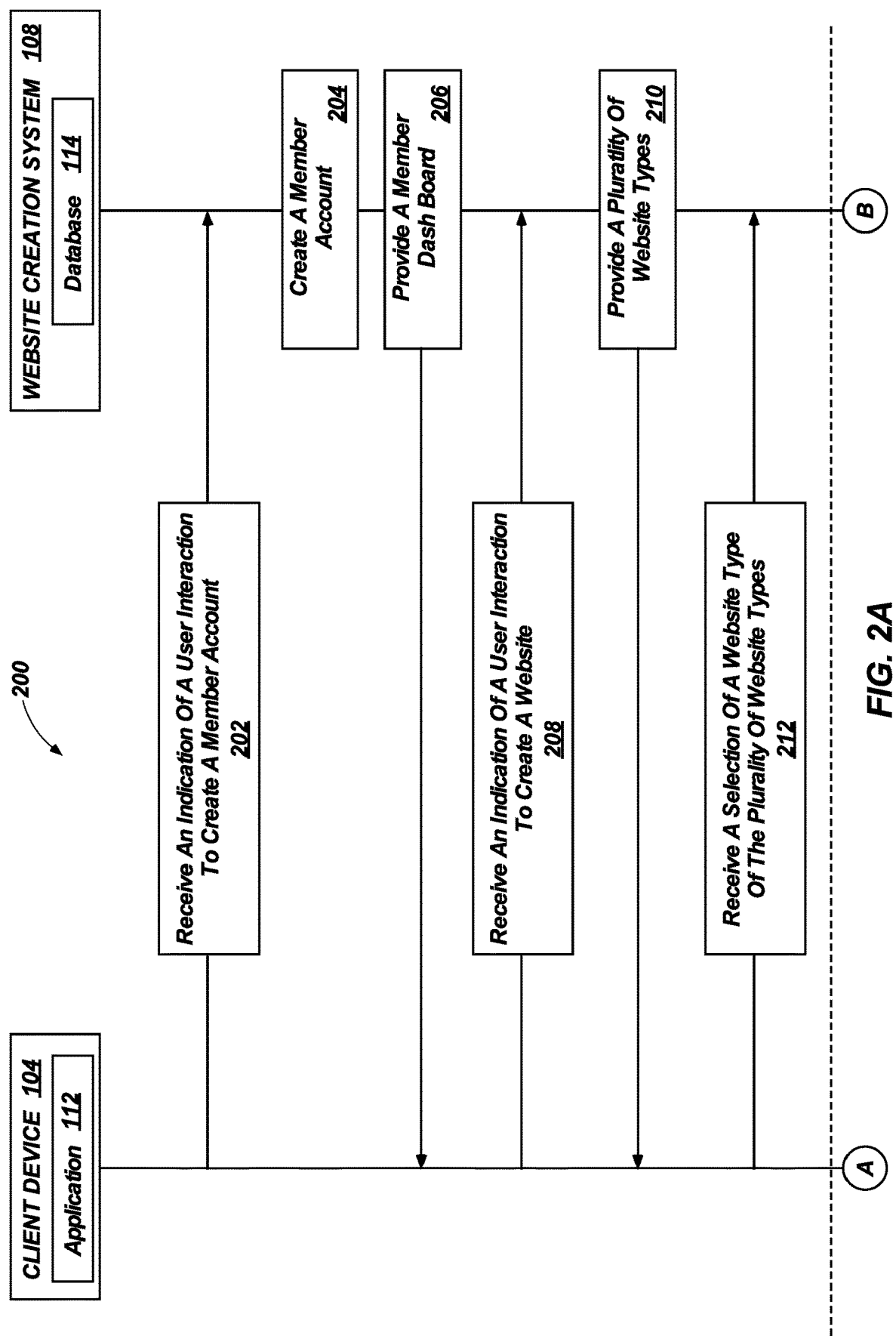

WEBSITE CREATION SYSTEM FOR CREATING WEBSITES HAVING AT LEAST ONE SERIES OF DIRECTIONAL WEBPAGES AND RELATED METHODS

CROSS-REFERENCE TO RELATED APPLICATION

This application is a continuation of U.S. patent application Ser. No. 15/880,255, filed Jan. 25, 2018, the disclosure of which is hereby incorporated herein in its entirety by this reference.

TECHNICAL FIELD

This disclosure relates generally to a website creation system having at least one series of direction webpages and related methods.

BACKGROUND

The Internet has played an influential role in developing electronic commerce. Furthermore, one who may want to create a website for selling a product and/or service in hopes of yielding favorable results (e.g., sales, opt-ins, etc.) must often hire two or more different companies to develop and generate different portions of the website. This results in extreme, and in some cases, hindering costs before ever selling a product and/or service. Moreover, the website owner typically has very little ability to personally edit and adjust the website to meet the adjusting needs of website guests (e.g., customers) without again turning to the development companies and paying additional fees for their services. Other options for creating a website include employing "cookie cutter" (e.g., one type fits all) websites that all look substantially the same and are not tailored to the website owners' products and/or services. Thus, because the resultant websites are not created under one roof and/or are not tailored to products and/or services offered thereon, the resultant websites are often clunky, not user friendly, and overall unappealing and unpersuasive to potential customers. This, conventionally, results in abandoned carts, lost sales, and overall poor results for the website owner. Accordingly, these and other disadvantages exist with respect to conventional methods and systems for creating websites.

BRIEF SUMMARY

The various embodiments described below provide benefits and/or solve one or more of the foregoing or other problems in the art with systems and methods for creating websites. Some embodiments of the present disclosure include a method for creating a website. The method may include providing, to a user for display on a client device, via a website creation system, a user dashboard comprising a selectable option to create a website; receiving a selection of the selectable option to create a website; in response to receiving the selection of the selectable option to create a website, providing, to the user for display on the client device, a plurality of website types for selection, each website type including a series of directional webpages configured to cause a particular user interaction with a website; receiving a selection of a website type of the plurality of website types; in response to receiving the selection of a website type of the plurality of website types, providing, to the user for display on the client device, a plurality of website templates for selection, the plurality of website templates being particular to the selected website type; receiving a selection of a website template of the plurality of website templates; in response to receiving the selection of a website template, generating and launching a generic website based on the selected website type and selected website template and providing, to the user for display on the client device, a website editor graphical user interface, the website editor graphical interface including a plurality of webpage tabs, each webpage tab of the plurality of webpage tabs representing a webpage of the series of directional webpages; receiving at least one indication of a user interaction editing at least one webpage of the series of directional webpages; and in response to receiving the at least one indication of a user interaction editing at least one webpage of the series of directional webpages, editing the launched generic website to create a customized website.

In one or more embodiments, the systems and methods provide a method for creating a response action within a created website. The method may include receiving, from a client device, a selection of a type of response action, the response action to be performed in response to a triggering condition; receiving a selection of at least one rule of the triggering condition; receiving a selection of an operand for the at least one rule of the triggering condition; creating the triggering condition; and in response to receiving an indication that the triggering condition has occurred, performing the response action.

BRIEF DESCRIPTION OF THE DRAWINGS

Various embodiments will be described and explained with additional specificity and detail through the use of the accompanying drawings in which:

FIGS. 2A-2C illustrate a sequence flow diagram that a website creation system can utilize to create a website in accordance with one or more embodiments;

DETAILED DESCRIPTION

Figure 1:
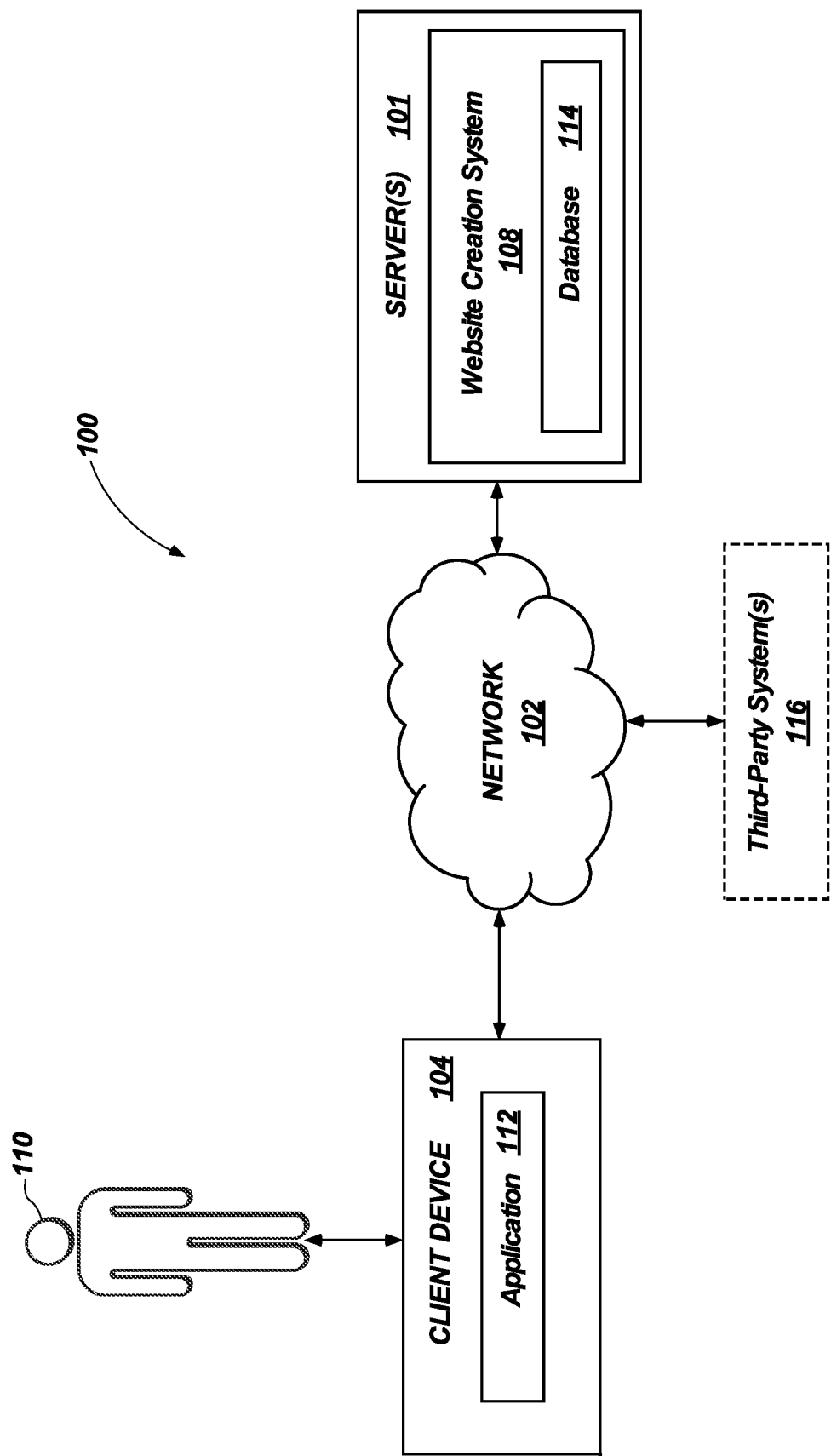
FIG. 1 illustrates a schematic representation of an environment within which a website creation system can operate in accordance with one or more embodiments of the present disclosure.

The illustrations presented herein are not actual views of any particular website creation system, or any component thereof, but are merely idealized representations, which are employed to describe the present invention.

One or more embodiments of the present disclosure include a website creation system for enabling a user (e.g., a system administrator) to create a website. Furthermore, the website creation system may enable the user to create a website having a series of directional webpages. The series of directional webpages may include a series (e.g., a sequence or funnel) of webpages that are ordered and designed to entice (e.g., elicit, encourage, prompt, evoke, cause, etc.) at least one particular user interaction with the website. For instance, the series of directional webpages may funnel (e.g., direct, aim, etc.) a guest of the website toward a particular user interaction. In one or more embodiments, the series of directional webpages may include a plurality of sequential webpages provided sequentially one after another during a single web browsing session. In additional embodiments, the series of directional webpages may include a plurality of sequential webpages provided sequentially one after another during multiple different web browsing sessions. In some embodiments, the series of directional webpages may be designed and intended to cause a guest of the created website to remain on the website, opt into an email list, provide contact information (e.g., an email address, a telephone number, a social media identifier, etc.), share a portion of the website on social media, complete a purchase, complete multiple purchases, add an item to a cart, visit another website, interact with a chat messenger, view a video on the website, view an image on the website, etc.

Because the website creation system of the present disclosure enables a user to create, within a single system, a website that includes at least one series of directional webpages ordered and designed to entice particular user interaction, the website creation system is advantageous over conventional website creation systems. For instance, because the website creation system enables a user to create a website while working with a single system instead of multiple developers and systems, the website creation system reduces required processing power, memory, and communication resources needed to facilitate creating websites. Accordingly, the website creation system results in less data transfer and data bandwidth usage for a computer/communication system. In other words, the website creation system results in less required processing power and communication bandwidth in comparison to conventional systems. As a result, the website creation system of the present disclosure, in comparison to conventional systems, may be a more appropriate system for mobile devices. Additionally, the in view of the foregoing, the website creation system may result in more user friendly, consistent, attractive, and persuasive websites in comparison to conventional website creation systems and methods.

Moreover, some embodiments of the present disclosure include a website creation system for enabling a user (e.g., a system administrator) to monitor and edit a website to meet the needs of current traffic (e.g., guests) visiting the website. For instance, the website creation system includes a website editor graphical user interface ("GUI") for display to the system administrator on a client device. The website editor GUI may include a selectable element (e.g., tab) representing each webpage of the website (e.g., each webpage of the series of directional webpages of the website). Furthermore, the website editor GUI may enable the system administrator to add media objects (e.g., images, videos, audio files, hyperlinks, surveys, text) to the website. Moreover, the website editor GUI may enable a system administrator to add interfaces with social media networks and to add payment processors to the website.

Additional embodiments of the present disclosure include a website creation system for enabling a user (e.g., a system administrator) to create one or more response actions related to the user's created website. For instance, the user can customize the website to perform a response action in response to one or more triggering conditions correlating to one of more actions and/or attributes of one or more guests (e.g., visitors) of the website. As a non-limiting example, a response action may include sending a communication to a guest of the website based on the guest's status or number of followers within a social media network. Each of the response actions may include multiple specific ordered rules that enable automation of further tasks (e.g., sending communications to a guest in response to a guest's actions, adding the guest to broadcasts, tagging the guest, etc.). Furthermore, the multiple specific rules cause the website to perform the response actions in specific technological ways.

FIG. 1 illustrates a schematic diagram of an environment 100 in which a website creation system can operate according to one or more embodiments of the present disclosure. As illustrated, the environment 100 includes a client device 104, at least one server 101 including a website creation system 108, a network 102, and one or more third-party system(s) 116. The website creation system 108, the client device 104, and the third-party system(s) 116 can communicate via the network 102. The network 102 may include one or more networks, such as the Internet, and can use one or more communications platforms or technologies suitable for transmitting data and/or communication signals. Although FIG. 1 illustrates a particular arrangement of the client device 104, the server 101, the third-party system(s) 116, and the network 102, various additional arrangements are possible. For example, the server 101 and, accordingly, the website creation system 108, can directly communicate with the client device 104, bypassing the network 102.

As illustrated in FIG. 1, a user 110 can interface with the client device 104, for example, to communicate with the server 101 and to utilize the website creation system 108 to create a website. The user 110 can be an individual (i.e., human user), a business, a group, or any other entity. Although FIG. 1 illustrates only one user 110 associated with the client device 104, the environment 100 can include any number of a plurality of users that each interact with the environment 100 using a corresponding client device.

In some embodiments, the website creation system 108 can include a system associated with an entity such as a website creation provider, which provides tools and editor graphical user interfaces to user(s) 110 to create websites. For example, the website creation system 108 may enable a user (referred to hereinafter as "system administrator") to create a website that includes a series of directional webpages designed and sequenced (e.g., arranged in a particular order) to elicit (e.g., entice) a particular user interaction with the website (e.g., provide contact information, opt in to receive communications from the website, complete a purchase, complete multiple purchases, add something to a cart, interact with (e.g., click) a selectable element (e.g., a button) of the website, share the website and/or a purchase on a social media network). Additionally, the website creation system 108 may enable a system administrator to monitor activity on a website created via the website creation system 108 and/or edit a website created via the website creation system 108. The series of directional webpages is described in further detail below in regards to FIGS. 2A-2C.

Furthermore, the website creation system 108 may enable a system administrator to create one or more response actions. As used herein, the term "response actions" may refer to actions taken by a response action system of the website creation system 108 in response to one or more triggering conditions correlating to one of more actions and/or attributes of one or more guests (e.g., visitors) of a website created via the website creation system 108. For example, a response action may include the response action system of the website creation system 108 sending a communication to a guest of the website in response to the guest having a particular number of followers on a social media network. The response actions are described in greater detail below in regard to FIGS. 4A and 4B.

In particular embodiments, the website creation system 108 may be capable of linking a variety of entities (e.g., third-party systems 116 and a guests). As an example and not by way of limitation, the website creation system 108 may enable users (e.g., guests of a website created via the website creation system 108) to interact with each other as well as receive content from third-party systems 116 (e.g., payment processors, social media networks, website monitoring services, email platforms) or other entities, and/or to allow guests of a website created via the website creation system 108 to interact with these entities through an application programming interfaces (API) or other communication channels.

In particular embodiments, a website creation system 108 may include one or more types of servers, one or more data stores, one or more interfaces, including but not limited to APIs, one or more web services, one or more content sources, one or more networks, or any other suitable components, e.g., that servers may communicate with. In this sense, the website creation system 108 may provide a platform, or backbone, which other systems, such as third-party systems 116, may use to provide website creation and monitoring services and website operation services and functionality to guests of a website created via the website creation system.

As shown in FIG. 1, in some embodiments, the website creation system 108 can include a database 114. As is described in greater detail below in regard to FIGS. 2A-2C, the website creation system 108 can utilize the database to store contact data packages and generated websites.

In some embodiments, the client device 104 includes a client application 112 installed thereon. In one or more embodiments, the client application 112 can be associated with the website creation system 108. For example, the client application 112 allows the client device 104 to directly or indirectly interface with the website creation system 108. The client application 112 also enables the user 110 (e.g., system administrator) to create, monitor, and edit websites via the website creation system 108 and the client device 104. For example, the client application 112 can include a web browsing application and/or a website creation application.

The third-party systems 116 may include additional systems that may interface with the website creation system 108. For example, in some embodiments, the third-party systems 116 may include social media networks (e.g., FACEBOOK®, TWITTER®, GOOGLE® PLUS, etc.) with which the website creation system 108 may share and/or acquire information related to traffic on a created website. In additional examples, the third-party systems 116 may include payment processors (e.g., PAYPAL®, VISA PAY®, STRIPE®, NMI®, etc.) that enable guests to complete purchases on a created website. In further embodiments, the third-party systems 116 may include website monitoring systems, email platforms, etc.

Both the client device 104 and the server 101 (and the website creation system 108) can represent various types of computing devices with which guests can interact. For example, the client device 104 and/or the server 101 can be a mobile device (e.g., a cell phone, a smartphone, a PDA, a tablet, a laptop, a watch, a wearable device, etc.). In some embodiments, however, the client device 104 and/or server 101 can be a non-mobile device (e.g., a desktop or server). Additional details with respect to the client device 104 and the server 101 are discussed below with respect to FIG. 6.

Figure 2B:
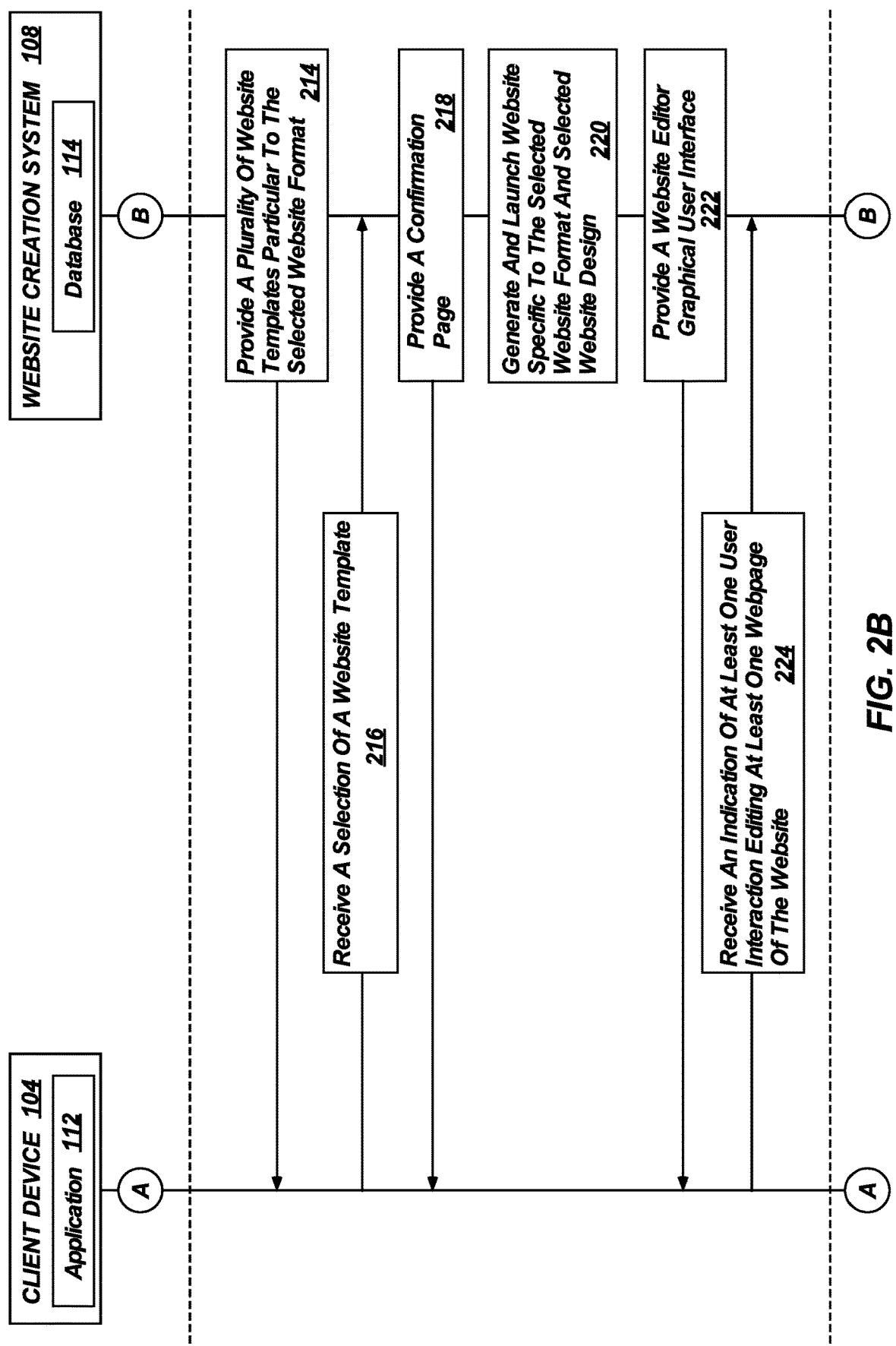
Figure 2C:
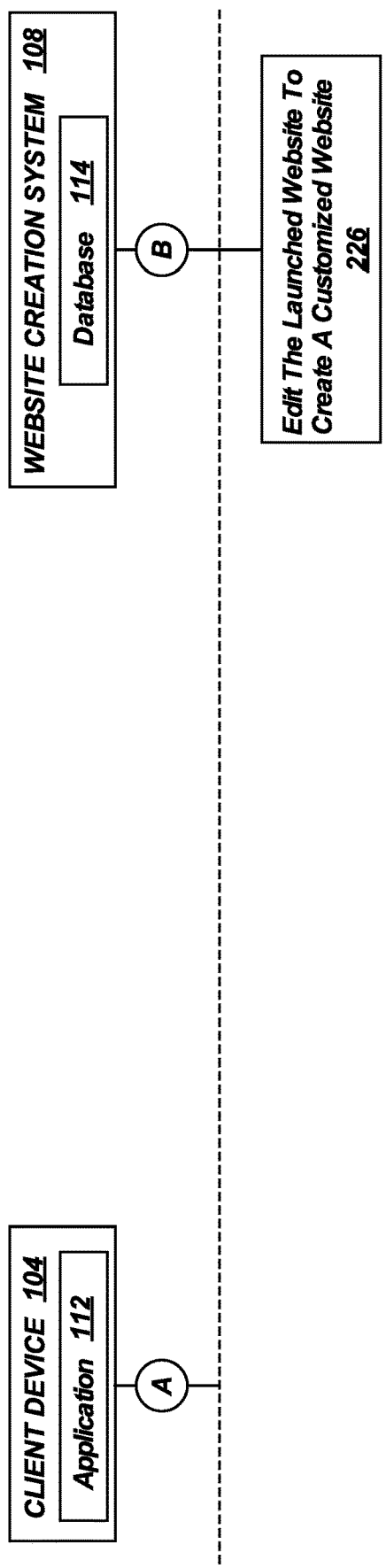

FIGS. 2A-2C illustrate a sequence-flow diagram 200 that a website creation system 108 can utilize to create a website including a series of directional webpages that are configured to illicit a particular user interaction with the website. The client device 104 and website creation system 108 shown in FIGS. 2A-2C may be as described with reference to FIG. 1.

Referring to the sequence-flow diagram 200, a client device 104 can detect one or more user interactions requesting creation of a member account with the website creation system 108. For instance, the client device 104 can detect a user interaction requesting creation of a member account via the client application 112 (e.g., a web browsing application displaying an option to create a member account within the website creation system 108). For example, the client application 112 can detect the user interaction requesting creation of a member account.

As shown in FIG. 2A, upon the client device 104 detecting the user interaction requesting creation of a member account, the website creation system 108 receives an indication of a user interaction to create a member account, as shown in act 202. For example, upon detecting the user interaction requesting creation of a member account, the client device 104 and/or the client application 112 can provide an indication of the user interaction to the website creation system 108. In one or more embodiments, the website creation system 108 can receive the indication of the user interaction through the network 102.

As shown in FIG. 2A, in response to receiving the indication of the user interaction to create a member account, the website creation system 108 creates a member account, as shown in act 204. In some embodiments, creating the member account may include the website creation system 108 requesting a user identifier including one or more of an email address, a username, a login credential, etc. Furthermore, in some embodiments, the request for the user identifier can include a request to create (e.g., choose, select, assign, etc.) a user credential (e.g., password). In one or more embodiments, the website creation system 108 can request the user identifier and/or user credential within the client application 112.

Upon creating a member account, the website creation system 108 provides a member dashboard to a user (e.g., a website creator or system administrator) for display on client device, as shown in act 206. The member dashboard may include one or more selectable options to create (i.e., commence creating) a website. Furthermore, the member dashboard may include one or more content windows for displaying statistics (e.g., page views, opt-ins, sales) related to a system administrator's websites. For example, the member dashboard may display comparisons of statistics regarding the system administrator's websites. The member dashboard is described in greater detail below in regard to FIG. 3A.

In response to receiving the member dashboard, the client device 104 may display the member dashboard. For example, the client device 104 can display the member dashboard within the client application 112 and on a display screen. For instance, the client application 112 can display the member dashboard within a graphical user interface ("GUI") of the client application 112 and/or the website creation system 108.

In addition to providing a member dashboard, the website creation system 108 receives an indication of a user interaction to create a website, as shown in act 208 of FIG. 2A. For example, upon detecting a user interaction to create a website, the client device 104 and/or the client application 112 can provide an indication of the user interaction to create a website to the website creation system 108. In one or more embodiments, the website creation system 108 can receive the indication of the user interaction to create a website through the network 102.

Upon receiving the indication of the user interaction to create a website, the website creation system 108 provides a plurality of website types to the client device 104, as shown in act 210 of FIG. 2A. Each website type may include a series of directional webpages. As discussed briefly above, the phrase a "series of directional webpages" refers to a series (e.g., a sequence) of webpages that are ordered and designed to entice (e.g., elicit, encourage, prompt, evoke, cause, etc.) at least one particular user interaction with the website. For instance, the series of directional webpages may funnel (e.g., direct, aim, etc.) a guest of the website toward a particular user interaction. In one or more embodiments, the series of directional webpages may include a plurality of sequential webpages designed to be provided sequentially one after another during a single web browsing session. In additional embodiments, the series of directional webpages may include a plurality of sequential webpages designed to be provided sequentially one after another during multiple different web browsing sessions. In some embodiments, the particular user interaction (e.g., the sought after user interaction) may include one or more of remaining webpages on the website, opting into an email list, opting into receiving push messages via a social media network, application, or web browser, providing contact information (e.g., an email address, a telephone number, a social media identifier, etc.), sharing a portion of the website on social media, completing a purchase, accepting an up-sell option, completing multiple purchases, adding an item to a cart, visiting another website, interacting with a chat messenger, viewing a video on the website, interacting with a webinar, viewing an image on the website, etc.

As noted above, in some embodiments, each webpage of a series of directional webpages may be presented in a single browsing session. In other embodiments, webpages of a series of directional webpages may be presented in multiple different browsing sessions. For instance, a first webpage of a series of directional webpages may be presented in a first browsing session, and a second webpage of a series of directional webpages may be presented in a second browsing session (e.g., a second browsing session initiated in response to an interaction within an email sent to a guest by the website creation system 108).

In one or more embodiments, each webpage of the series of directional webpages may include one or more text elements, media elements, form elements, advance form elements, countdown elements, content block elements, miscellaneous elements, and special elements. Text elements may include headlines, sub-headlines, paragraphs, and bullet lists. Media elements may include images, image popups, videos, video popups, audio files, and audio players. Form elements may include buttons, input forms, select (e.g., drop down) boxes, and text areas. Advance form elements may include short message service (SMS) signups, billing addresses, shipping addresses, and surveys. Countdown elements may include countdown timers, minute timers, and day timers. Content block elements may include icons, dividers, progress bars, image features, navigation bars, image lists, pricing tables, and frequently asked questions (FAQs). The miscellaneous elements may include text blocks, social shares, social media comments, and custom JS/HTML. The special elements may include order forms, order confirmations, guest logins, membership content, and webinar dates.

Furthermore, each webpage of the series of directional webpages may be associated with an overall category and type of webpage. For example, the website creation system 108 may have the following page categories: 1) presale page category, 2) opt-in page category, 3) thank you page category, 4) sales page category, 5) upsell page category, 6) order forms category, 7) webinar page category, 8) membership page category, 9) affiliate page category, and 10) other page category.

The presale page category may include survey pages, article pages, presale pages, and click pop pages. The opt-in page category may include squeeze pages, reverse squeeze pages, lead magnets, and coupons. The thank you page category may include thank you pages, offer walls, bridge pages, and share pages. The sales page category may include video sales pages, sales letter pages, and product launch pages. The one time offer page category may include upsell pages and downsell pages. The order forms category may include two-step order pages, traditional order pages, video sales letter order pages, sales letter order pages, and product launch and order pages. The webinar pages category may include webinar registration pages, webinar confirmation pages, webinar broadcast rooms, and webinar replay rooms. The membership pages category may include access pages and members' areas. The affiliate pages category may include access pages and affiliate areas. The other pages category may include application pages, ask pages, store fronts, home pages, hero pages, and live demo pages. Each of the foregoing pages is described in detail below.

Presale Page

The presale page may be a page that preempts a sales page. The presale page may introduce a product and/or service without giving the direct option of purchasing or commencing a purchase of the product. For instance, the presale page may be designed and intended to peak a guest's interest in a product and/or service.

Article Page

The article page is another type of presale page. The article page may include an article relating to a product and/or service. Furthermore, the article page may include a selectable element (e.g., button) for entering a series of directional webpages (described above) to purchase the product and/or service. Additionally, the article page may be designed and intended to peak a guest's interest in a product and/or service.

Survey Page

The survey page includes one or more questions related to a product and/or service. Additionally, the survey page can include one or more questions about a guest visiting a website. The survey page may be designed and intended to grow a guest's interest in a product and/or service and to elicit a relatively small commitment from the guest (e.g., answering one or more questions on the survey page).

Click Pop Page

The click pop page is a pop up that appears on a page. The click pop page may be triggered via a button on a page or when a guest tries to leave the page. The click pop page may be designed and intended to keep a guest on the website by offering additional discounts, products, services, benefits, or free products to the guest.

Squeeze Page

For instance, the squeeze page may include a curiosity-based headline including one or more questions where an email input is required to see answers to the one or more questions. The squeeze page may be designed and intended to cause a guest to provide an email address (e.g., opt in to an email list) to the website creation system 108. In alternative embodiments, the squeeze page may be designed and intended to cause a guest to provide information related to a social media account, an instant message identifier, a telephone number, etc.

Reverse Squeeze Page

The reverse squeeze page may include a video training, and after the video ends, the reverse squeeze page may invite a guest to opt in to an email list. Thus, the reverse squeeze page is designed and intended to cause a guest to provide an email address (e.g., opt in to an email list) to the website creation system 108. In alternative embodiments, the reverse squeeze page may be designed and intended to cause a guest to provide information related to a social media account, an instant message identifier, a telephone number, etc.

Lead Magnet Page

The lead magnet page may include an incentive (e.g., a magnet) for providing an email address. For example, the incentive may include one or more of a report, ebook, video, etc. In response to providing an email address, the lead magnet page may provide the incentive. Thus, the lead magnet page is designed and intended to cause a guest to provide an email address (e.g., opt in to an email list) to the website creation system 108. In alternative embodiments, the lead magnet page may be designed and intended to cause a guest to provide information related to a social media account, an instant message identifier, a telephone number, etc.

Coupon Page

The coupon page may be similar to the lead magnet page. However, the coupon page may provide a discount (e.g., a coupon code or voucher) on a product and/or service for providing an email address.

Thank You Page

The thank you page may appear after a guest fills out an opt-in form or purchases a product and/or service. The Thank You Page may include one or more thank you messages, discounts, benefits, selectable elements for sharing the purchase on social media networks, additional opt-in opportunities, etc.

Offer Wall

The offer wall may be displayed after an initial purchase and may include additional products and/or services for purchase. In some embodiments, the products and/or services may be discounted relative to standard prices and may include "one time offers" that do not require inputting payment information a second time. For example, the offer wall may provide additional specialized offers to a guest after making an initial purchase. The offer wall may be designed and intended to cause the guest to make additional purchases after making a first purchase.

Bridge Page

The bridge page may provide additional information concerning a product and/or service to a guest. The bridge page may serve to increase and/or peak a guest's interest in a product and/or service. For example, the bridge page may remind a guest about the importance of the product and/or service. As a non-limiting example, the bridge page may be designed and intended to bridge an idea of product's importance with the concept of purchasing the product.

Share Page

The share page may include a thank you page. However, the share page may include an invitation to share the guest's experience (e.g., purchase) via a social media network (e.g., FACEBOOK®, TWITTER®, GOOGLE® PLUS). The share page may be designed and intended to cause a guest to share a purchase and/or a website on a social media network.

Video Sales Letter Page

The video sales letter page is a sales page that includes a video concerning a product and/or service in addition to a spoiler box that includes elements (e.g., a bullet list of information) included in the video that may increase a guest's intrigue and/or curiosity. The video sales letter page includes an option to commence a purchase of a product and/or service (e.g., an "add to cart button"). The video sales letter page may be designed to peak a guest's interest in a product and/or service.

Sales Letter Page

The sales letter page includes a letter concerning a product and/or service including aspects of the product and/or service and associated advantages. The sales letter page includes an option to commence a purchase of a product and/or service (e.g., an "add to cart button"). The sales letter page may also be designed to peak a guest's interest in a product and/or service.

Product Launch Page

The product launch page includes at least one video concerning a product and/or service and links to additional videos in a sequence of videos concerning the product and/or service. The additional videos may be unlocked after a particular period of time and/or watching a previous video in the sequence. The product page may also be designed to peak a guest's interest in a product and/or service and to cause the guest to perform a relatively small commitment in watching the videos.

OTO ("Upsell") Page

The upsell page may appear after a guest has entered in payment information to purchase a product and/or service. The upsell page may include a "one-click" offer to add to an order. The "one-click" offer only requires a single user interaction (e.g., a click) to add a product to the purchase and/or to purchase the product. In other words, the upsell page does not require the guest to re-enter payment information. The upsell page may be designed and intended to cause the guest to complete additional purchases on the website.

Downsell Page

The downsell page may appear in the event that a guest refuses the "one-click" offer of the upsell page. The downsell page may offer a less expensive digital version of a physical product or a payment plan for the original product and/or service. The downsell page may not appear if the guest accepts the "one-click" offer of the upsell page. The downsell page may also be designed and intended to cause the guest to complete additional purchases on the website.

Two-Step Order Form

The two-step order form page may include a first page/step requesting a guest's address and a second page/step requesting the guest's payment information. The two-step order form page may be designed and intended to cause the guest to perform a relatively small commitment in entering an address. The small commitment of entering an address may encourage a guest to fulfill the request for the guest's payment information and eventual purchase.

Traditional Order Form

The traditional order form page collects for a guest's address and payment information on a single page.

Video Sales Letter Order Form

The video sales letter order form page includes the video sales letter page with an order form below the video. For instance, the order form may appear after a guest clicks an "Add to Cart" button. As noted above, the video sales letter page may be designed and intended to peak a guest's interest in a product and/or service, and the order form may give the guest the immediate ability to purchase the product and/or service.

Sales Letter Order Form

The sales letter order form page includes the sales letter page with an order form embedded into the page. As noted above, the sales letter page may be designed and intended to peak a guest's interest in a product and/or service, and the order form gives the guest the immediate ability to purchase the product and/or service.

The Product Launch Order Form

The product launch order form page includes at least some elements of the product launch page but also includes an order form in addition to, or instead of, elements of the product launch page. As mentioned above, the product launch page may be designed and intended to peak a guest's interest in a product and/or service and to cause the guest to perform a relatively small commitment in watching videos of the product launch page. Additionally, the order form gives the guest the immediate ability to purchase the product and/or service.

Webinar Registration Page

The webinar registration page allows a guest to register for a webinar and may include one or more headlines regarding the webinar.

Webinar Confirmation Page

The webinar confirmation page provides a "thank you" to a guest for registering for a webinar. The webinar confirmation page may also include one or more offers to purchase a product and/or service prior to the webinar.

Webinar Broadcast Room

The webinar broadcast room is the page broadcasting the webinar. The webinar broadcast room only permits the webinar to be viewed live.

Webinar Replay Room

The webinar replay room is similar to the webinar broadcast room but it permits the webinar to be paused and replayed. The webinar replay room may include a countdown clock and an "add to cart" button as well. The webinar replay room may be designed and intended to cause a guest to purchase a product within a particular period of time after viewing a webinar.

Member's Access Page

The member's access page may allow guests to create and login to their account of a created website.

Member's Area

The member's area may include content, sections, and lessons concerning products and/or services.

Affiliate Access Page

The affiliate access page enables an affiliate to create an account and to login to their account of a website created via the website creation system 108.

Affiliate Area

The affiliate area provides tools to help affiliates promote products and/or services. For instance, the tools may include banner ads, sample email copies, social media ads, etc.

Application Page

The application page enables guests of the website to apply to work with creators of the website (e.g., a website owner) and/or sellers of a product and/or service.

Storefront Page

The storefront page includes images and/or videos of products and/or services.

Home Page

The home page may include any traditional home page known in the art.

Live Demo Page

The live demo page may include a single or repeated live demonstration of a product and/or service. The live demo page may be designed and intended to peak a guest's interest in a product and/or service.

Ask Page

The ask page is a one-question survey intended to discover a guest's number one challenge related to a system administrator's topic and/or product and/or service. The ask page may be designed and intended to grow a guest's interest in a product and/or service and to elicit a relatively small commitment from the guest (e.g., answering one or more questions on the survey page). Additionally, the ask page is designed and intended to acquire information regarding what is preventing a guest from purchasing a product and/or service.

Hero Page

The hero page highlights a business or individual related to the system administrator's topic and/or product and/or service. The hero page may include social media bios, email signatures, etc. Again, the hero page may be designed and intended to grow a guest's interest in a product and/or service.

Indoctrination Page

The indoctrination page appears after a guest joins a list (e.g., email list) or registers for a webinar. The indoctrination page may include information related to a product and/or service. The indoctrination page may be designed and intended to prepare a guest for later received communications (e.g., emails) from the website creation system 108 or a webinar and to eventually purchase the product and/or service.

Referring to all of the foregoing described pages together, any of the pages may include one or more timers related to any aspect of the page. For example, any benefit, product, and/or service offered on a page may include a respective timer. The timer may indicate a period of time remaining in which a guest may choose to accept the offer. In some embodiments, a timer may start (e.g., start counting down) relative to an action taken by a guest. For instance, a timer may start in response to a guest making a first purchase, watching a video, providing a response to a question, opening a page, opening a communication (e.g., email), etc. The one or more times may be designed and intended to create a sense of urgency in the guest and to cause the guest to more readily accept an offer.

With continued reference to FIG. 2A, as mentioned briefly above, each website type of the plurality of website types provided by the website creation system 108 may include a respective series of directional webpages of a plurality of different series of directional webpages. In some embodiments, the website creation system 108 may include the following different series (e.g., funnels) of directional webpages: 1) squeeze page series, 2) reverse squeeze series, 3) lead magnet series, 4) bridge series, 5) survey series, 6) application series, 7) ask campaign series, 8) two-step tripwire series, 9) video sales letter series, 10) sales letter series, 11) membership series, 12) daily deal series, 13)

invisible series, 14) webinar series, 15) auto-webinar series, 16) product launch series, 17) hero series, 18) homepage series, 19) cancellation series, 20) storefront series, 21) summit series, and 22) live demo series. In one or more embodiments, the website creation system 108 may include at least ten different types of series. In additional embodiments, the website creation system 108 may include at least twenty different types of series. In further embodiments, the website creation system 108 may include at least twenty-two different types of series. Each of the above listed series is described in detail below.

Squeeze Page Series

The squeeze page series may include at least two pages: a squeeze page and a thank you page. As mentioned above, the squeeze page series may be designed to generate curiosity and to entice a guest to provide an email address (e.g., opt in to an email list). For example, the squeeze page series may offer a benefit for providing an email address. The thank you page provides the promised benefit.

Reverse Squeeze Page Series

The reverse squeeze page series may include at least two pages: a reverse squeeze page and a thank you page. The reverse squeeze page series may be designed to provide a benefit (e.g., a free video) prior to requesting a guest to provide an email address (e.g., opt in to an email list). The thank you page provides additional information about products and/or services and the option to "share" the guest's experience via a social media network.

Lead Magnet Series

The lead magnet series may include at least two pages: a lead magnet page and a thank you page. The lead magnet series may provide a benefit in exchange (e.g., report, video, or a tangible) for a guest's email address.

The Bridge Series

The bridge series may include at least two pages: a squeeze page and a bridge page. The bridge series may connect two concepts that setup a later sale. The squeeze page may entice a guest to provide an email address, and the bridge page may provide additional information regarding a product and/or service and a link (e.g., hyperlink) to another page (e.g., an affiliate's page) to purchase the product and/or service.

The Survey Series

The survey series may include at least one page: a survey page. The survey series may be designed to entice a guest to interact with the website (e.g., providing responses to questions and making commitments) and to acquire information related to the guest such that later pages may be tailored to the guest.

The Application Series

The application series may include at least three pages: a reverse squeeze page, an application page, and a thank you page. The application series enables a guest to apply to become a client. The application series facilitates a guest to be qualified (e.g., vetted) before becoming a client.

Ask Campaign Series

The ask campaign series may include at least two pages: an ask page and a thank you page. The ask campaign series may be designed to determine what a guest really wants in regard to a product and/or service. The ask page may ask a question, and the thank you page may provide reward (e.g., a product) for responding to the question.

Two-Step Tripwire Series

The two-step tripwire series may include at least four pages: a two-step order page, an upsell page, a downsell page, and an offer wall. The two-step tripwire series may offer a product at a significant discount such that guests are very likely to purchase the product. Upon a purchase via the two-step order page, the upsell and/or downsell pages follow-up with the guest to provide additional offers to the guest.

Video Sales Letter Series

The video sales letter series may include at least four pages: a video sales letter and order form page, an upsell page, a downsell page, and an offer wall. The video of the video sales letter page may serve to convince a guest to accept an initial offer and purchase a product and/or service. The upsell and downsell pages may serve to increase a cart value depending on a guest's decision regarding the initial offer.

Sales Letter Series

The sales letter series may include at least four pages: a sales letter order form page, an upsell page, a downsell page, and an offer wall. The sales letter of the sales letter page may serve to convince a guest to accept an initial offer and purchase a product and/or service. The upsell and downsell pages may serve to increase a cart value depending on a guest's decision regarding the initial offer.

Membership Series

The Membership Series may include at least four pages: a video sales letter and order form page, an offer wall, a membership access page, and a membership page. The membership series may be designed to entice guests to sign up for paid membership sites, paid newsletters, etc.

Daily Deal Series

The daily deal series may include at least two pages: a two-step order form page and a share page. The two-step order form page may include an offer (e.g., an irresistible offer) that entices guests to create an account. The share page (e.g., thank you page) encourages the guests to share the offer on social media networks.

Invisible Series

The invisible series may include at least three pages: a video sales letter and order form page, an upsell page, and an offer wall. The invisible series may be designed to give away a relatively large amount of value for free upfront while requiring a guest's credit card information. The upsell page and offer wall is shown after a video (e.g., a training video) to offer the guest additional products and/or services. Furthermore, a thank you page may include a messages such as "Do nothing, and your credit card will be billed in two days. If you did not like to the training, just let me know and we will not bill you at all."

Webinar Series

The webinar series may include at least four pages: a webinar registration page, a webinar confirmation page, an indoctrination page, and a replay page. The webinar series may include a first phase where guests register for a seat to attend a webinar and hear success stores to increase curiosity. The webinar is typically hosted by a third-party. The webinar series may further include a second phase where the guests attend another webinar and watch replays while a window to buy begins to close creating true urgency and scarcity.

Auto-Webinar Series

The auto-webinar series may include at least five pages: a webinar registration page, a webinar confirmation page, webinar broadcast, a replay page, and an indoctrination page. The auto webinar plays every hour. A guest may register for a webinar on the webinar registration page and the webinar confirmation page may provide a data and time for the webinar. The guest may be emailed the indoctrination page. After the webinar, the guest may be emails links to the replay page.

Product Launch Series

The product launch series may include at least six pages: a product launch page, three sales pages, and a product launch and order form page. The product launch series may be designed to build anticipation (via the three sales pages and product launch page) prior to enabling a guest to purchase a product and/or service. For instance, the three sales pages may be emailed to a guest a day apart from each other before finally opening up a cart and allowing the guest to purchase a product. The cart may be closed after a few days.

Hero Series

The hero series may include at least two pages: a hero page and a thank you page. The hero page may include a bio, an option for guests to join an email newsletter, and a request to follow a social media account. The thank you page may be provided in response to the guest joining the email list or following the social media account.

Homepage Series

The homepage series may include at least two pages: a home page and a thank you page. The home page may include, for example, a story of a business and invites guests to opt in to an email list. The home page may also include one or more products and/or services for purchase. The thank you page may be presented in response to opting-in or purchasing a product.

Cancellation Series

The cancellation series may include at least two pages: a survey page and an article page. The cancellation series may be utilized when a guest is requesting a refund, to cancel a service, or return a product. The survey page may include one or more questions concerning the guest's request, and the article page may include one or more reasons why the guest should not want a refund, to cancel the service, or return the product.

Storefront Series

The storefront series may include at least one page: a storefront page. The storefront page may include at least substantially all of a website's products and/or services. Each product link may be linked to another series.

Summit Series

The summit series may include at least three pages: a sales letter page, a video sales letter and order form page, and a share page. The video sales letter and order form page may include an online summit with multiple speakers being interviewed about a product and/or service. The sales letter page may include a biography of each speaker and a portrait image of each speaker. The share page may encourage guests to share the online summit and/or invited friends to the online summit.

Live Demo Series

The live demo series may include at least two pages: a live demo page and a thank you page. The live demo page may include a live demonstration of a product and/or service and an option to purchase the product and/or service.

Referring still to FIGS. 2A, in some embodiments, the website creation system 108 may provide the plurality of website types within an array (e.g., a grid pattern) on a webpage within the application 112 of the client device 104. In some embodiments, each website type of the plurality of website types may include a selectable element (e.g., an icon, a button, a hyperlink, etc.). The website types are described in greater detail with reference to FIGS. 3B and 3C.

Upon receiving the plurality of website types, the client device 104 and/or application 112 may display the plurality of website types. For instance, the client device 104 and/or application 112 may display the plurality of website types on a display screen of the client device 104. Additionally, the client device 104 and/or application 112 may detect a user interaction selecting a website type of the plurality of website types.

Upon the client device 104 and/or application 112 detecting a user interaction selecting a website type of the plurality of website types, the website creation system 108 receives a selection of a website type of the plurality of website types, as shown in act 212 of FIG. 2A. For instance, upon detecting a user interaction selecting a website type of the plurality of website types, the client device 104 and/or application 112 may provide an indication of the selection of the website type to the website creation system 108. In one or more embodiments, the website creation system 108 can receive the indication of the selection of the website type through the network 102.

Referring to FIG. 2B, upon receiving the selection of the website type, the website creation system 108 provides a plurality of website templates particular to the selected website type to the client device 104 for display to the user 110 (e.g., system administrator), as shown in act 214. The plurality of website templates may include varying orientations, color schemes, drop in areas, animations, graphics, etc., that are specific to the selected website type. The website templates are described in greater detail below with reference to FIG. 3C.

Upon receiving the plurality of website templates, the client device 104 and/or application 112 may display the plurality of website templates. For instance, the client device 104 and/or application 112 may display the plurality of website templates on a display screen of the client device 104. Additionally, the client device 104 and/or application 112 may detect a user interaction selecting a website template of the plurality of website templates.

Upon the client device 104 and/or application 112 detecting a user interaction selecting a website template of the plurality of website templates, the website creation system 108 receives an indication of the selection of a website template of the plurality of website types, as shown in act 216 of FIG. 2B. For instance, upon detecting a user interaction selecting a website template of the plurality of website types, the client device 104 and/or application 112 may provide the indication of the selection of the website template to the website creation system 108. In one or more embodiments, the website creation system 108 can receive the indication of the selection of the website template through the network 102.

In response to receiving an indication of a selection of a website type and an indication of selection of a website template, the website creation system 108 may provide a confirmation page to the client device 104 for display to the user 110, as shown in act 218 of FIG. 2B. For instance, the website creation system 108 may provide a confirmation page to the client device 104 via the network. Additionally, in response to receiving an indication of a selection of a website type and an indication of selection of a website template, the website creation system 108 generates and launches a generic website specific to the selected website type and the selected website template, as shown in act 220 of FIG. 2B.

In some embodiments, the website creation system 108 may begin hosting the generic website on its servers 101, and the website creation system 108 may make the generic website available via the Internet and to the public. In one or more embodiments, the launch may include a soft launch (i.e., rolling out the website to test markets), as is known in the art. Additionally, the website creation system 108 may store data representing the generic website within the database 114 of the website creation system 108. In other embodiments, the website creation system 108 may provide the generic website to a third-party server (e.g., hosting system), and the generic website may be hosted on the third-party server.

In addition to generating and launching the generic website specific to the selected website and the selected website template, the website creation system 108 provides a website editor graphical user interface ("GUI") for display to the system administrator (e.g., the user 110) on the client device 104, as shown in act 222 of FIG. 2B. The website editor GUI may include a selectable element (e.g., tab) representing each webpage of the website (e.g., each webpage of the series of directional webpages of the website). Furthermore, the website editor GUI may enable the system administrator (e.g., user 110) to add media objects (e.g., images, videos, audio files, hyperlinks, surveys, text) to the website. Moreover, the website editor GUI may enable a system administrator to add interfaces with social media networks and to add payment processors to the website. The website editor GUI is described in greater detail in regard to FIG. 3E-3M.

Upon receiving the website editor GUI, the client device 104 and/or application 112 may display the website editor GUI. For instance, the client device 104 and/or application 112 may display the website editor GUI on a display screen of the client device 104. Additionally, the client device 104 and/or application 112 may detect one or more user interactions editing one or more elements of at least one webpage of the website within the website editor GUI.

Upon the client device 104 and/or application 112 detecting one or more user interactions editing one or more elements of at least one webpage of the website within the website editor GUI, the website creation system 108 receives an indication of the at least one user interaction editing at least one webpage of the website, as shown in act 224 of FIG. 2B. For instance, upon detecting one or more user interactions editing one or more elements of at least one webpage of the website, the client device 104 and/or application 112 may provide an indication of at least one user interaction editing at least one webpage of the website to the website creation system 108. In one or more embodiments, the website creation system 108 can receive the indication of at least one user interaction editing at least one webpage of the website through the network 102.

Referring to FIG. 2C, in response to receiving the indication of at least one user interaction editing at least one webpage of the website, the website creation system 108 edits the launched website according to the user interaction to create a customized website, as shown in act 226. Moreover, the website creation system 108 can store data representing the edit and the customized website in the database 114 of the website creation system 108. In some embodiments, the website creation system 108 can relaunch the customized website. As will be understood by one of ordinary skill in the art, act 222-226 may be repeated any number of times as a system administrator (e.g., user 110) edits a website.

FIGS. 3A-3M illustrate a collection of user interfaces including features of the website creation system 108 according to one or more embodiments of the present disclosure. In particular, the user interfaces show features of the website creation system 108. As will be described in more detail below, the components of the website editor GUI of the website creation system 108 as described in regard to FIGS. 1-2C can provide, along and/or in combination with the other components, one or more graphical user interfaces ("GUIs"). In particular, the components can allow a system administrator (e.g., user 110) to interact with a collection of display elements for a variety of purposes. For instance, FIGS. 3A-3M and the description that follows illustrate various example embodiments of the user interfaces and features that are in accordance with one or more embodiments of the present disclosure.

Figure 3A:
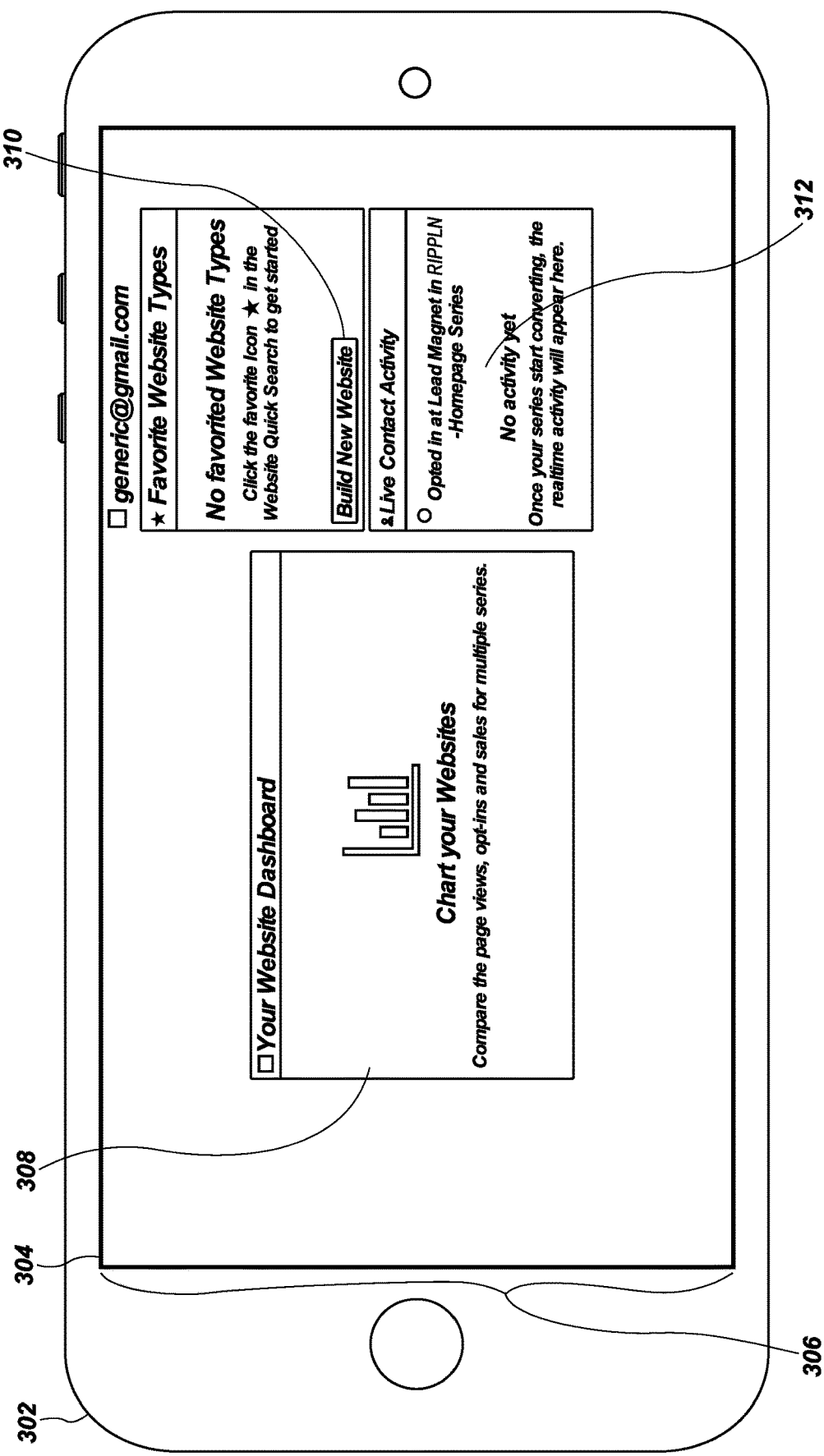
FIGS. 3A-3N illustrate a plurality of schematic representations of graphical user interfaces of the website creation system for enabling a system administrator to create a website according to one or more embodiments of the present disclosure.

For example, FIG. 3A illustrates a user device 302 that may implement one or more of the components or features of the website creation system. For purposes of the present disclosure, the user device 302 may be a client device (e.g., client device 104). As shown in FIG. 3A, in some embodiments, the user device 302 is a handheld device, such as a tablet device. As used herein, the term "handheld device" refers to a device sized and configured to be held/operated in one or more hands of a user (e.g., system administrator). In additional or alternative examples, however, any other suitable computing device, such as, but not limited to, a mobile phone device, larger wireless device, laptop or desktop computer, a personal digital assistant device, and/or any other suitable computing device can perform one or more of the processes and/or operations described herein.

The user device 302 includes a touch screen display 304 that can display user interfaces. Furthermore, the user device 302 receives and/or detects user input via the touch screen display 304. As used herein, a "touch screen display" refers to the display of a touch screen device. In one or more embodiments, a touch screen device may be the user device 302 with at least one surface upon which a user (e.g., a system administrator) may perform touch gestures (e.g., a laptop, a tablet computer, a personal digital assistant, a media player, a mobile phone, etc.). Additionally, or alternatively, the user device 302 may include any other suitable input device, such as a touch pad or those described below with reference to FIG. 6.

As shown in FIG. 3A, the touch screen display 304 of the user device 302 displays a website creation system graphical user interface ("GUI") 306 provided by the website creation system 108, which, in some embodiments, can be accessible by the user device 302. For example, as described above with reference to FIG. 1, the user device 302 (e.g., client device 104) can access the website creation system 108 via a network (e.g., network 102). As illustrated in FIG. 3A, in some embodiments, the website creation system GUI 306 can include a comparison content window 308, a "build a new website" selectable element 310, and an activity tracker window 312.

The comparison content window 308 may show a comparison of statistics for websites built by a system administrator utilizing the website creation system 108. For instance, the comparison content window 308 may show a comparison of page views, opt-ins (e.g., email opt-ins, newsletter opt-ins, webinar opt-ins, social media share opt-ins, etc.), and sales from websites built with the website creation system 108.

The "build a new website" selectable element 310 may include a hyperlink to a sequence of website builder and editor GUIs described below in regard to FIGS. 3B and 3L. The activity tracker window 312 may provide a complete or partial list of activities (e.g., page views, opt-ins, and sales) occurring in real time on websites built with the website creation system 108 and monitored by the system administrator.

Figure 3B:
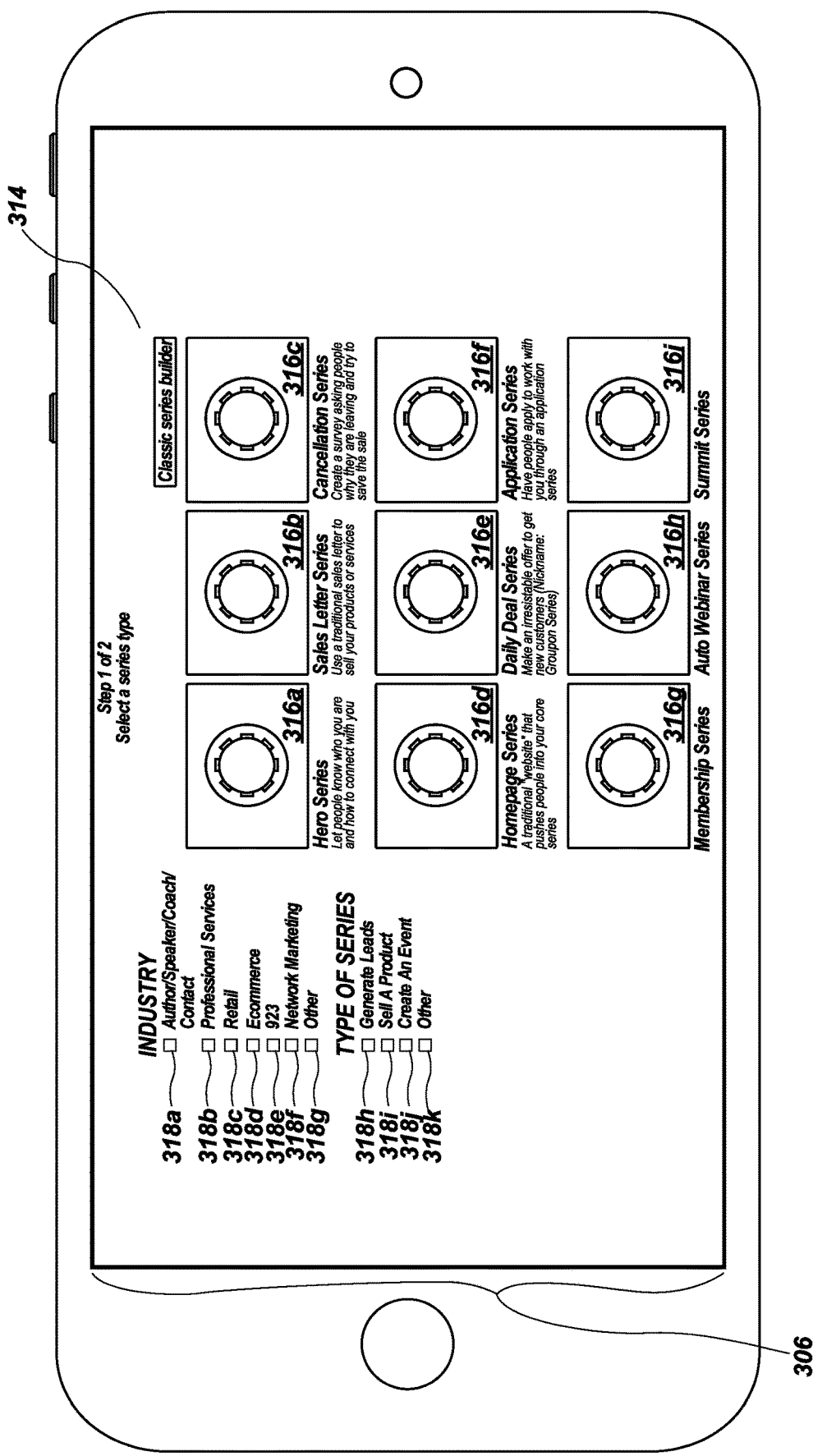

Referring to FIG. 3B, upon a selection of the "build a new website" selectable element 310, the website creation system 108 displays a website-type selection GUI 314. The website-type selection GUI 314 may display a plurality of website types 316a-316i (e.g., a plurality of selectable elements representing the plurality of website types 316a-316i). For example, the website-type selection GUI 314 may display any of the website types described above in regard to FIGS. 2A-2C. Furthermore, the website types 316a-316i may include any of the plurality of different series of directional webpages described above in regard to FIGS. 2A-2C.

Additionally, the website-type selection GUI 314 may include one or more filters 318a-318k for assisting in selecting a particular website type. For example, the filters 318a-318k may include author/speaker/coach/consultant, professional services, retail, ecommerce, b2b, network marketing, generate leads, sell a product, create an event, and other.

Figure 3C:
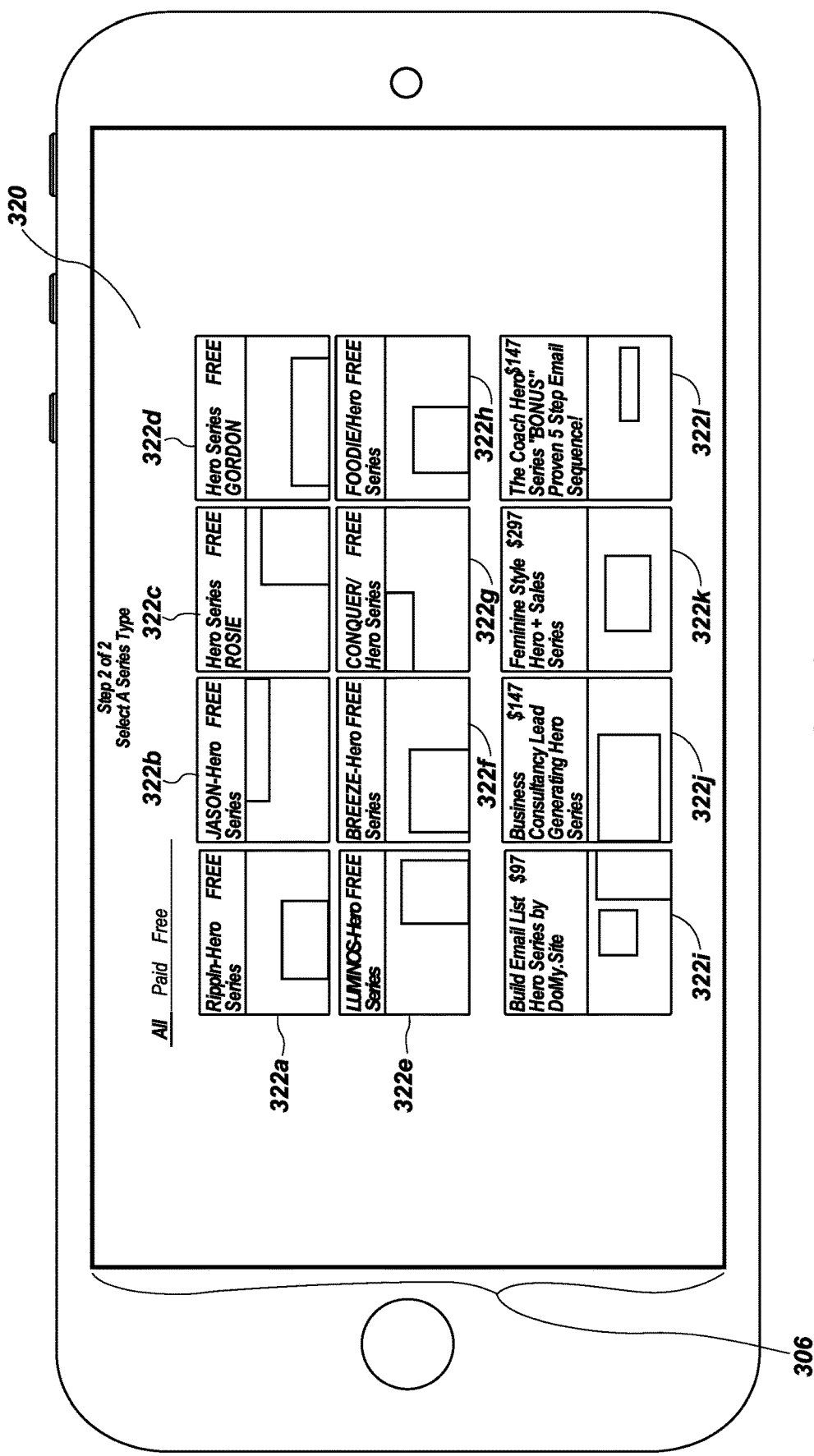

Referring to FIG. 3C, upon a selection of a website type, the website creation system 108 displays a website template selection GUI 320. The website template selection GUI 320 may include instructions on how to utilize the selected website type and a plurality of website templates 322a-322l (e.g., selectable elements representing the plurality of website templates) specific to the selected website type. In some embodiments, the plurality of website templates 322a-322l may be organized based on whether the website templates are included within a basic package of the website creation system 108 or have an additional cost associated with plurality of website templates 322a-322l. The plurality of website templates 322a-322l may include varying orientations, color schemes, drop in areas, animations, graphics, etc., that are specific to the selected website type. Furthermore, the website template selection GUI 320 may include any of the website templates 322a-322l described above in regard to FIGS. 3A-3C.

Figure 3D:
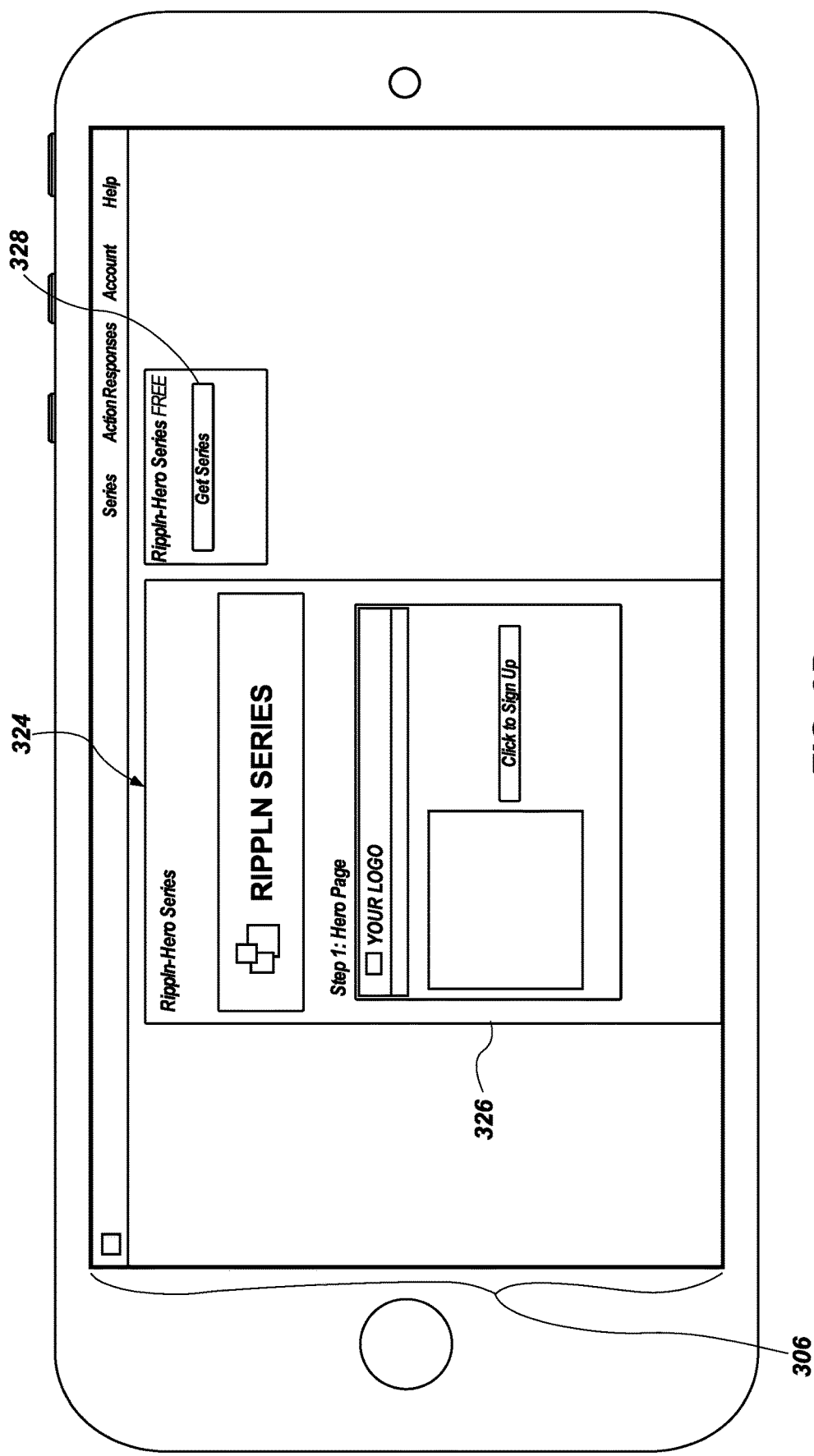

Referring to FIG. 3D, upon a selection of a website template, the website creation system 108 displays a confirmation GUI 324. The confirmation GUI 324 may include an overview window 326 showing an overview of the pages included within the selected website type and selected website template. Furthermore, the confirmation GUI 324 may include a confirmation button 328 for confirming the selected website type and the selected website template.

Figure 3E:
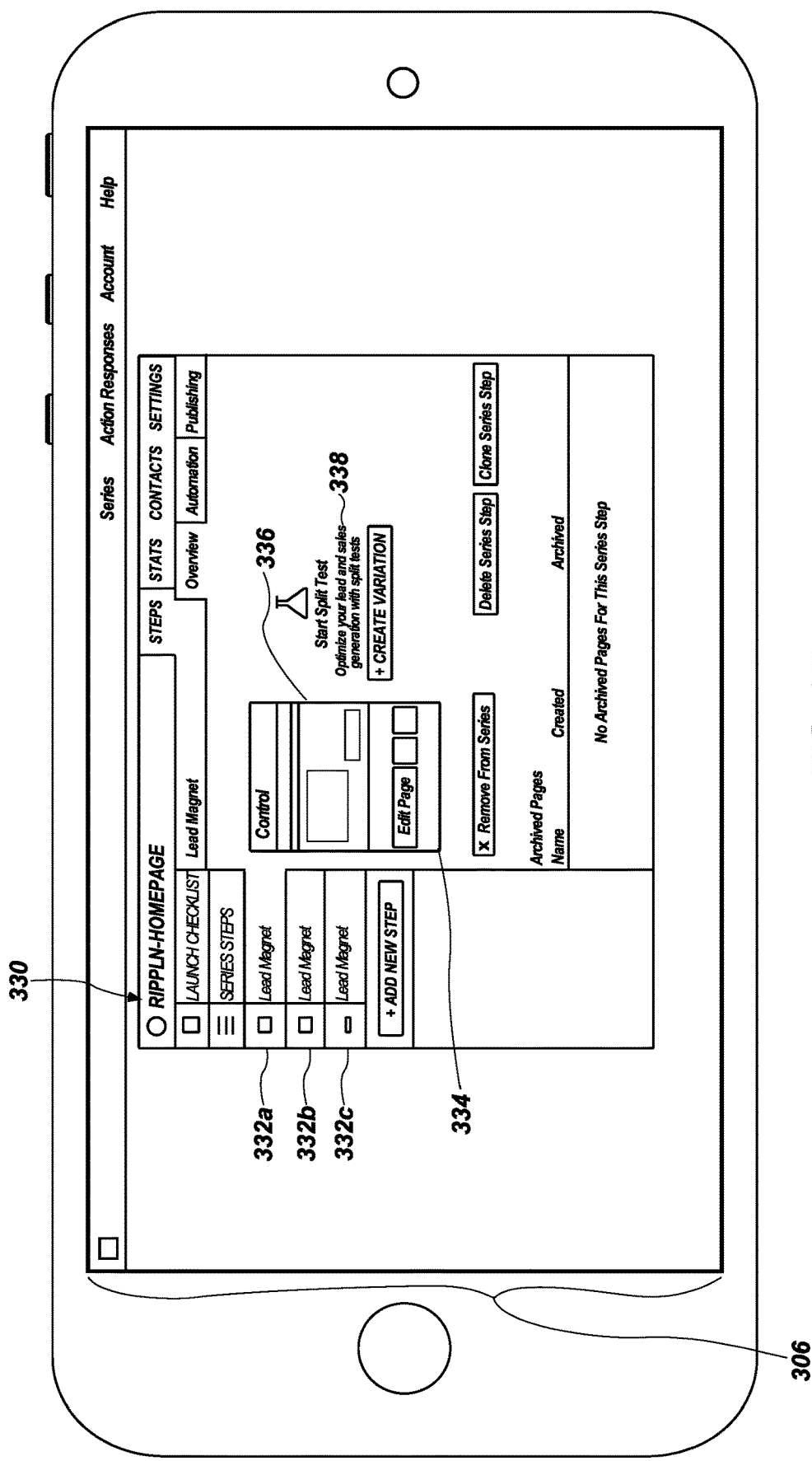

Referring to FIG. 3E, upon a selection of the confirmation button 328, the website creation system 108 generates and launches a generic website, as described above in regard to act 220 of FIG. 2B; furthermore, the website creation system 108 displays a website editor GUI 330 on the user device 302. The website editor GUI 330 may include a plurality of tabs 332a-332c representing each page, respectively, of the generic website. Each tab of the plurality of webpage tabs 332a-332c may include a control window 334, which enables a system administrator to edit the webpage associated with the tab. For example, the control window 334 enables a system administrator to add media objects (e.g., images, videos, text) to the webpage of the generic website. The control window 334 may also include a preview button 336 for previewing the webpage.

Additionally, each tab of the plurality of tabs 332a-332c may include a split test selectable element 338. The split test selectable element 338 may enable a system administrator to create a variation of a webpage associated with a single tab. For example, the split test selectable element 338 may enable a system administrator to associate two different webpages within a single tab.

Figure 3F:
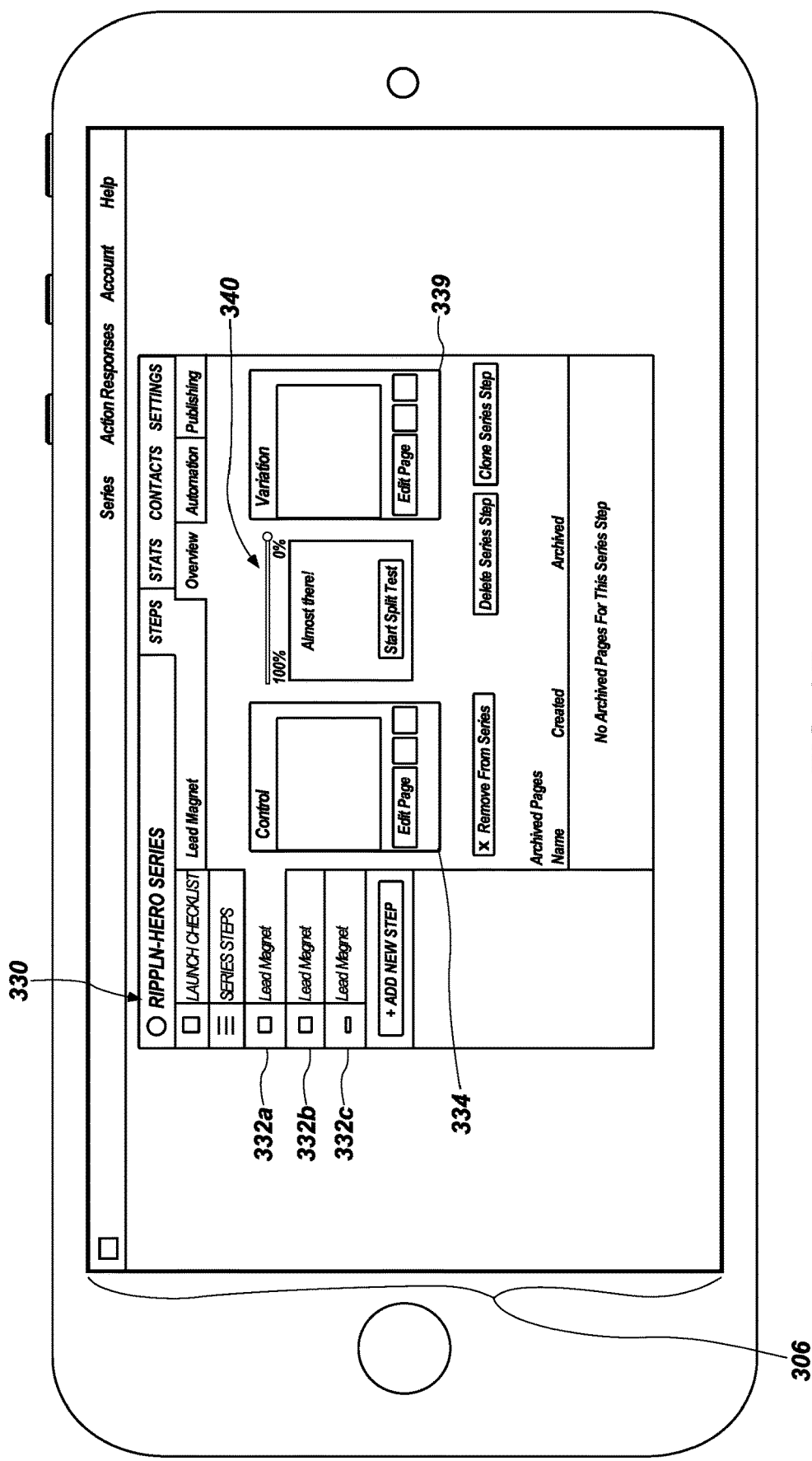

Upon selection of the split test selectable element 338, an additional control window 339 may be displayed for an additional (e.g., second) webpage associated with the tab, as shown in FIG. 3F. Furthermore, as shown in FIG. 3F, a system administrator may specify (via selection of the split test selectable element 338) what percentage of guests (i.e., traffic) will be shown a first webpage of the two different webpages when visiting the website and what percentage of guests will be show a second webpage of the two different webpages when visiting the website. For instance, the website editor GUI 330 may include a sliding selectable element 340 that enables a system administrator to specify what percentage of guests will be shown the first webpage and what percentage of guests will be show the second webpage. In some embodiments, the first webpage may be assigned between 0% and 100% of the guests of the website. Likewise, the second webpage may be assigned between 0% and 100% of the guests of the website. However, as will be understood by one of ordinary skill in the art, a sum of the percentage assigned to the first webpage and the percentage assigned to the second webpage will always equate to 100%. In additional embodiments, website creation system 108 may enable a system administrator to associate three, four, or five different webpages to a single tab, and website traffic may be split amongst all the different webpages in the manner described above.

Figure 3G:
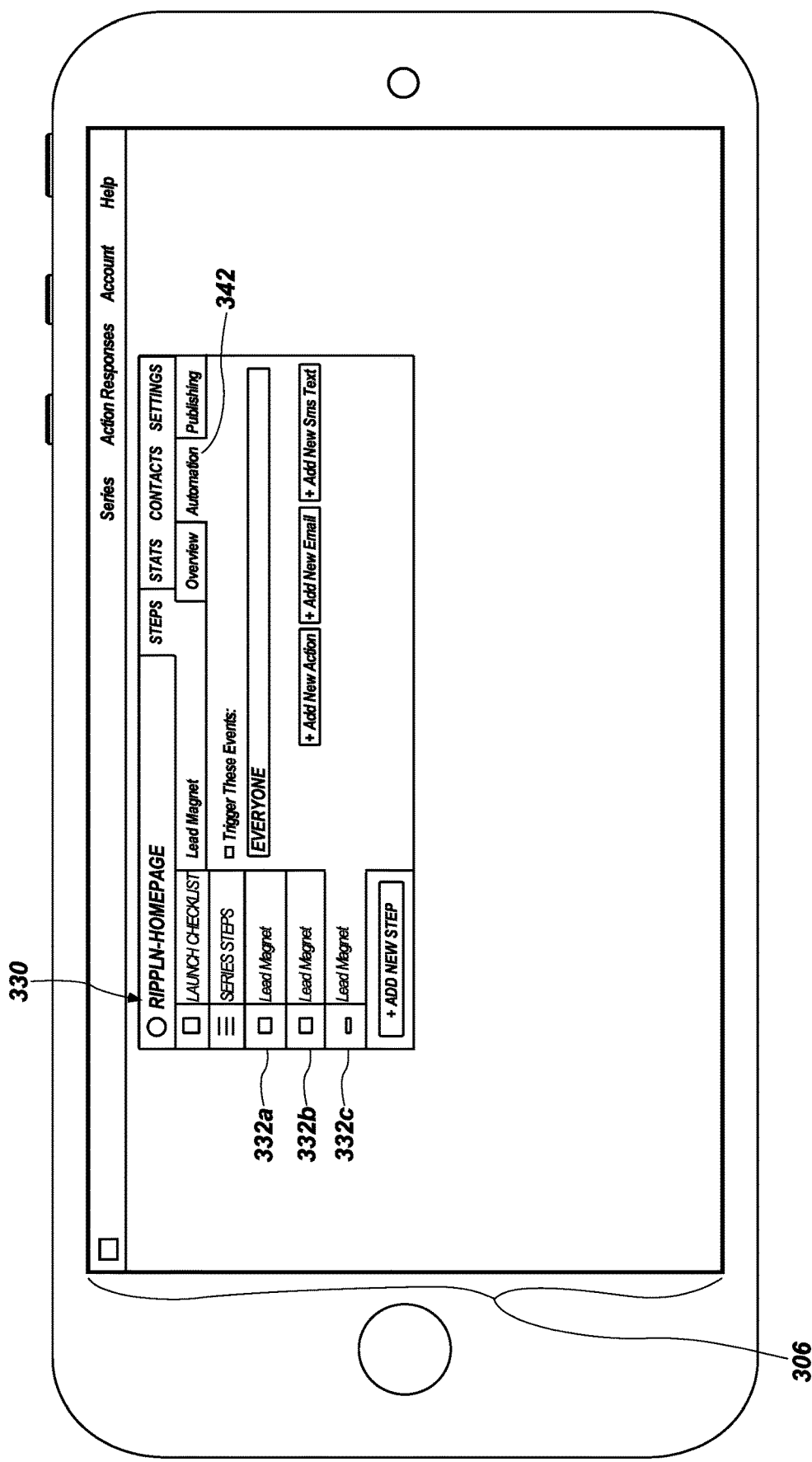

Additionally, referring to FIG. 3G, each tab of the plurality of tabs 332a-332c may include an automation tab 342. The automation tab 342 may enable a system administrator (e.g., a creator of the website) to create one or more triggers and events that result from the triggers. For example, a system administrator may set the one or more triggers to include a guest visiting the website, a guest making a purchase, a guest opting in to a communication list (e.g., email list), as guest participating in a webinar, a guest beginning a purchasing process but not completing the purchase, a guest beginning a webinar but not completing the webinar, a guest not accepting an up-sell option, etc., Furthermore, a system administrator may set the events to include sending an email and/or SMS message to a guest when one of the triggers occurs, tagging the guest, adding the guest to a communication list, etc.

Figure 3H:
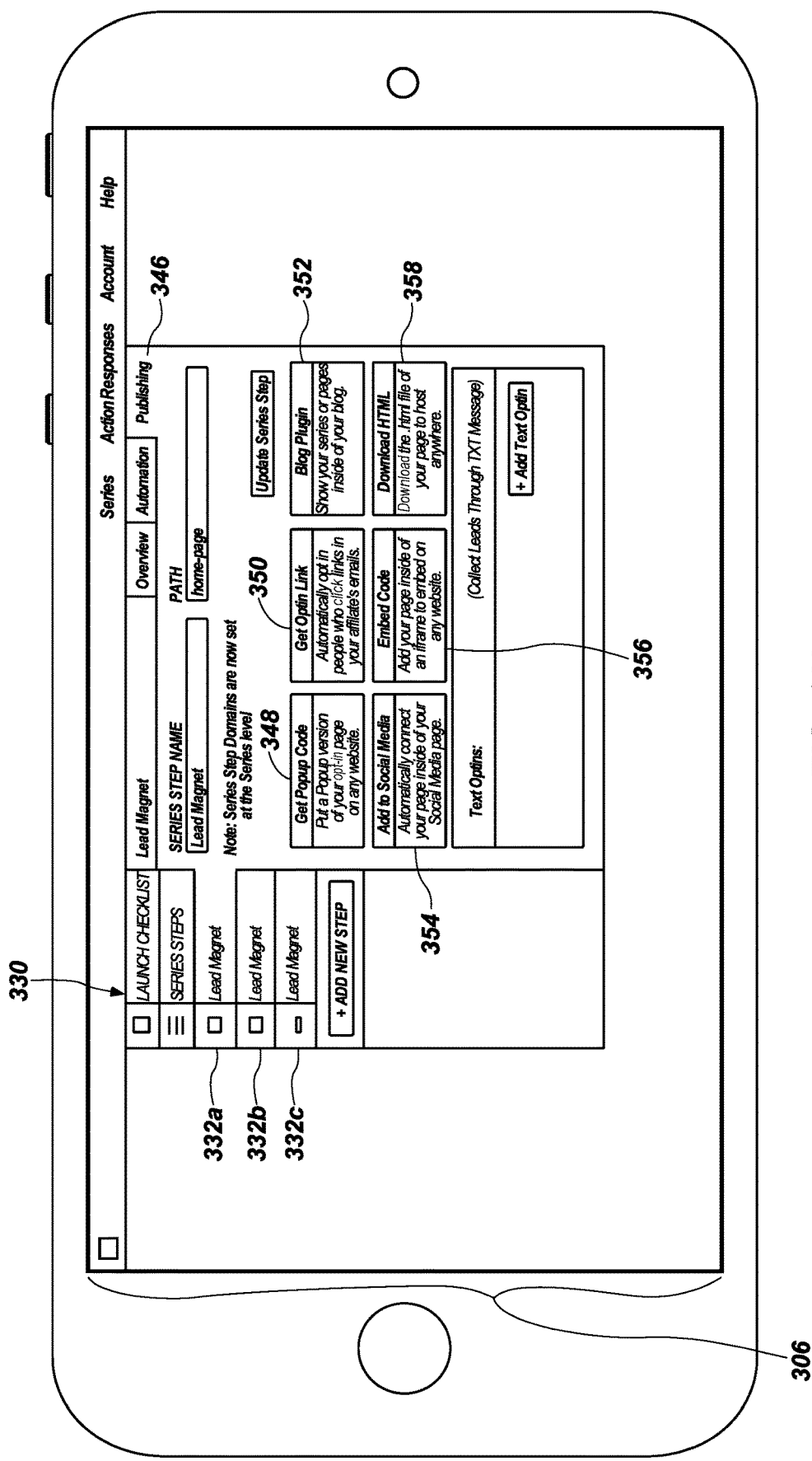

Furthermore, referring to FIG. 3H, each tab of the plurality of tabs 332a-332c may include a publishing tab 346. The publishing tab 346 may enable a system administrator (e.g., a creator of the website) to integrate the website with third-party systems 116 (FIG. 1).

In some embodiments, the publishing tab 346 may include a selectable element 348 for creating a pop-up version of a webpage of the website to appear on another website (e.g., a third-party website). Additionally, the publishing tab 346 may include a selectable element 350 for creating a link within an affiliate's website or emails that automatically opts in guests (e.g., adds the guest to an email list) that interact (e.g., click) the link. Moreover, the publishing tab 346 may include a selectable element 352 for adding a plugin to show the created website or webpages of the website within a blog (e.g., a WORDPRESS® blog). Furthermore, the publishing tab 346 may include a selectable element 354 for connecting the created website or webpages to a social media account (e.g., FACEBOOK® account) or page. Likewise, the publishing tab 346 may include a selectable element 356 for adding the created website and/or webpages inside of an iframe to embed within any third-party website. Also, the publishing tab 346 may include a selectable element 358 for downloading an .html file of the created website and/or webpages in order to host the created website and/or webpages at another location.

Figure 3I:
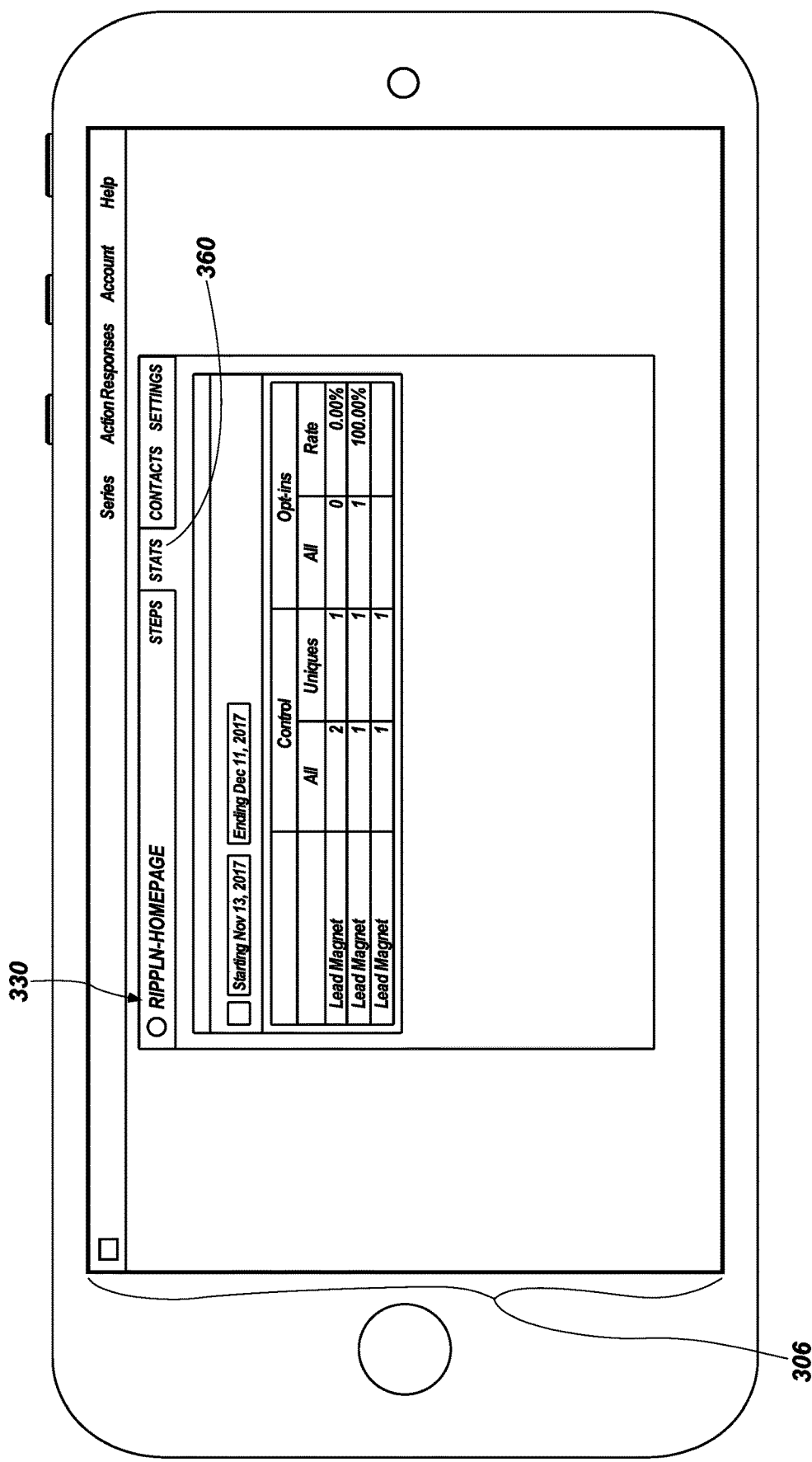

As shown in FIG. 3I, the website editor GUI 330 may include a statistics tab 360, whereon, when selected, may show statistics related to the created website. For example, the statistics tab 360 may show a total number of page views of the created website and/or pages within the created website for a given period of time. Furthermore, the statistics tab 360 may show a total number of opt-ins garnered by the created website during the given a period of time.

Figure 3J:
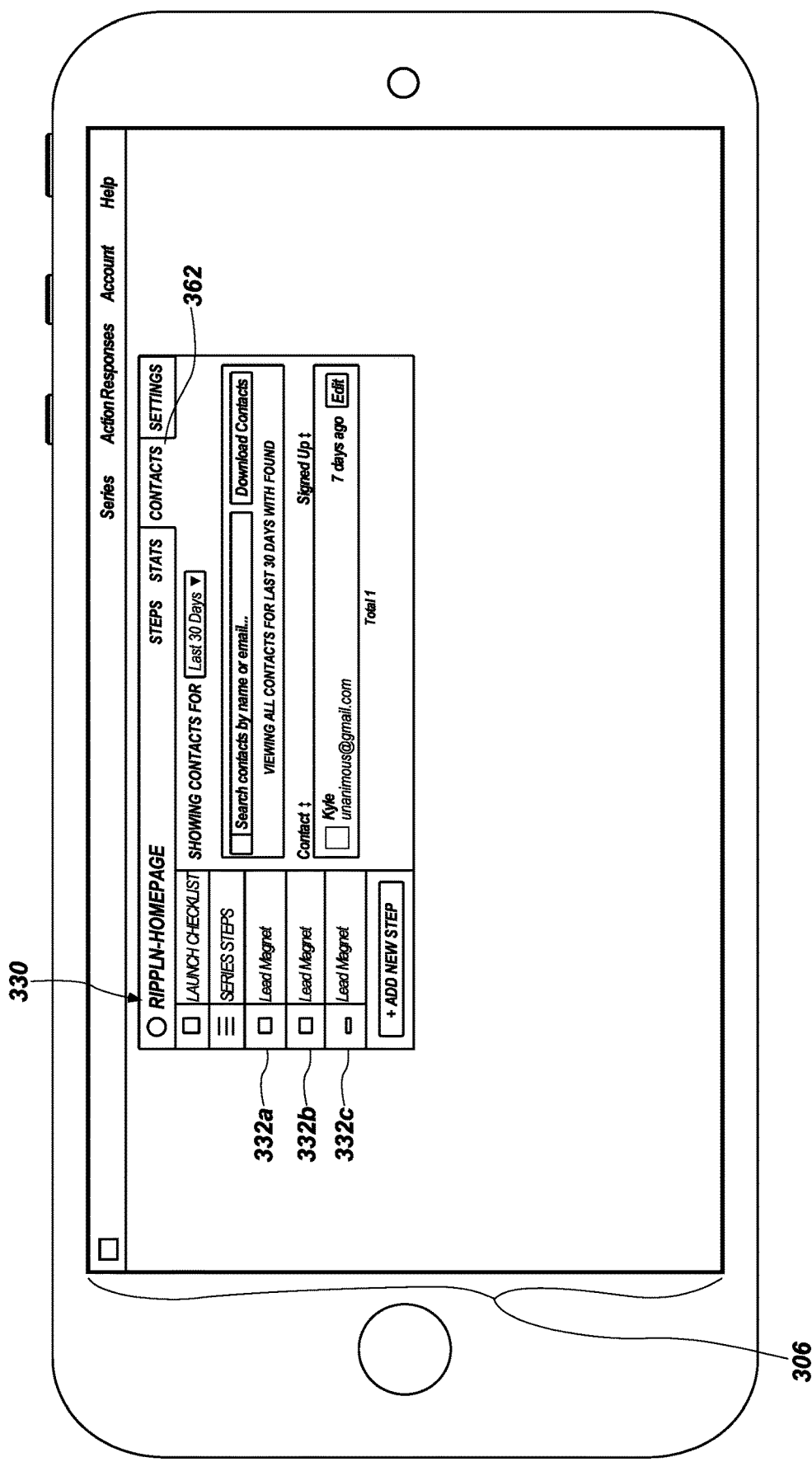

As shown in FIG. 3J, the website editor GUI 330 may further include a contacts tab 362, which, when selected, may show one or more contacts (e.g., email addresses) related to (e.g., garnered by) the created website. For example, the contacts tab 362 may show one or more contacts acquired by and through the created website. The contacts tab 362 may include an option to download the contacts. Furthermore, the one or more contacts of the contacts tab 362 can be filtered by individual webpages. In other words, which contacts were acquired through which webpage of the created website can be displayed.

Figure 3K:
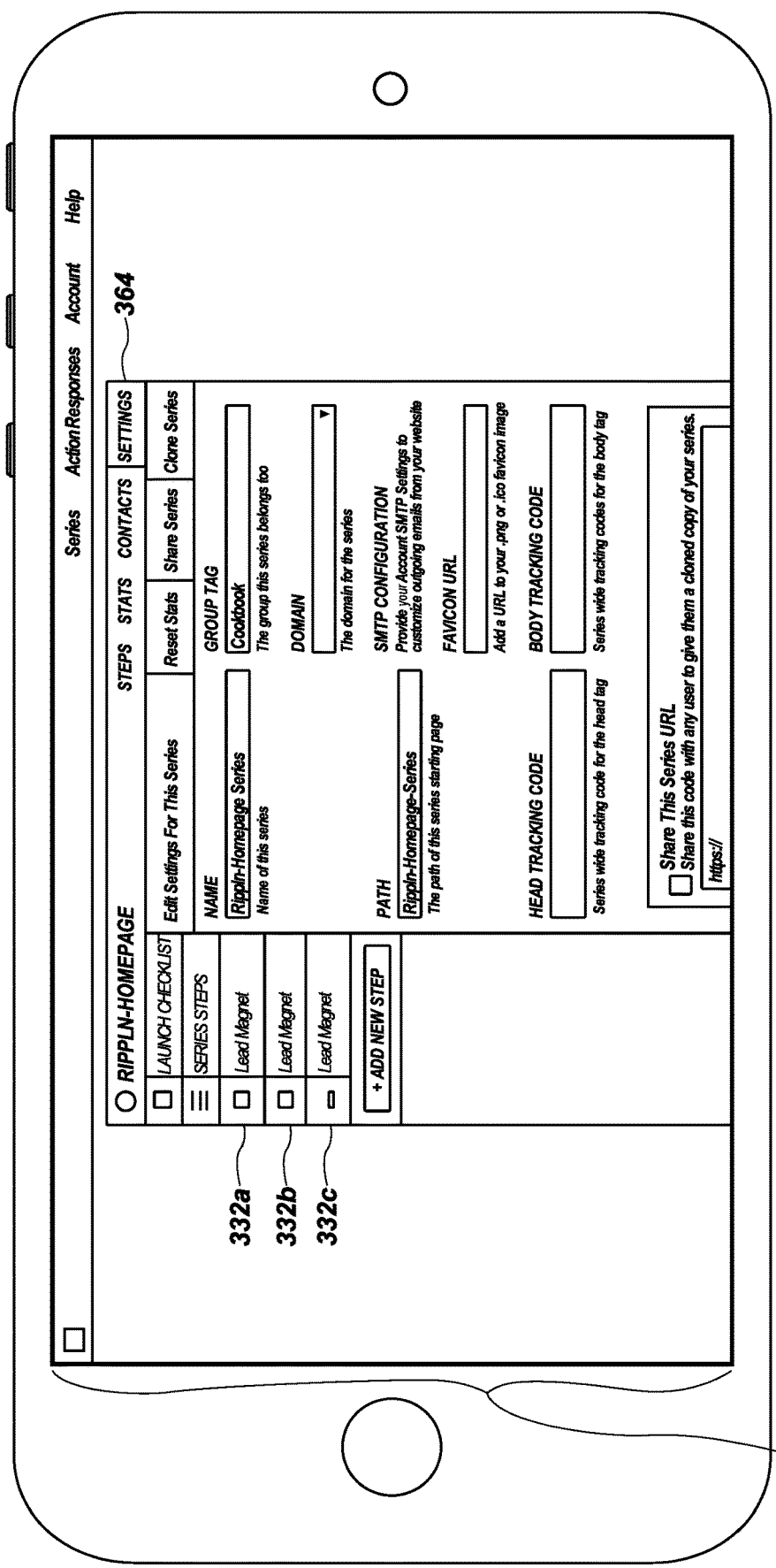
Figure 3L:
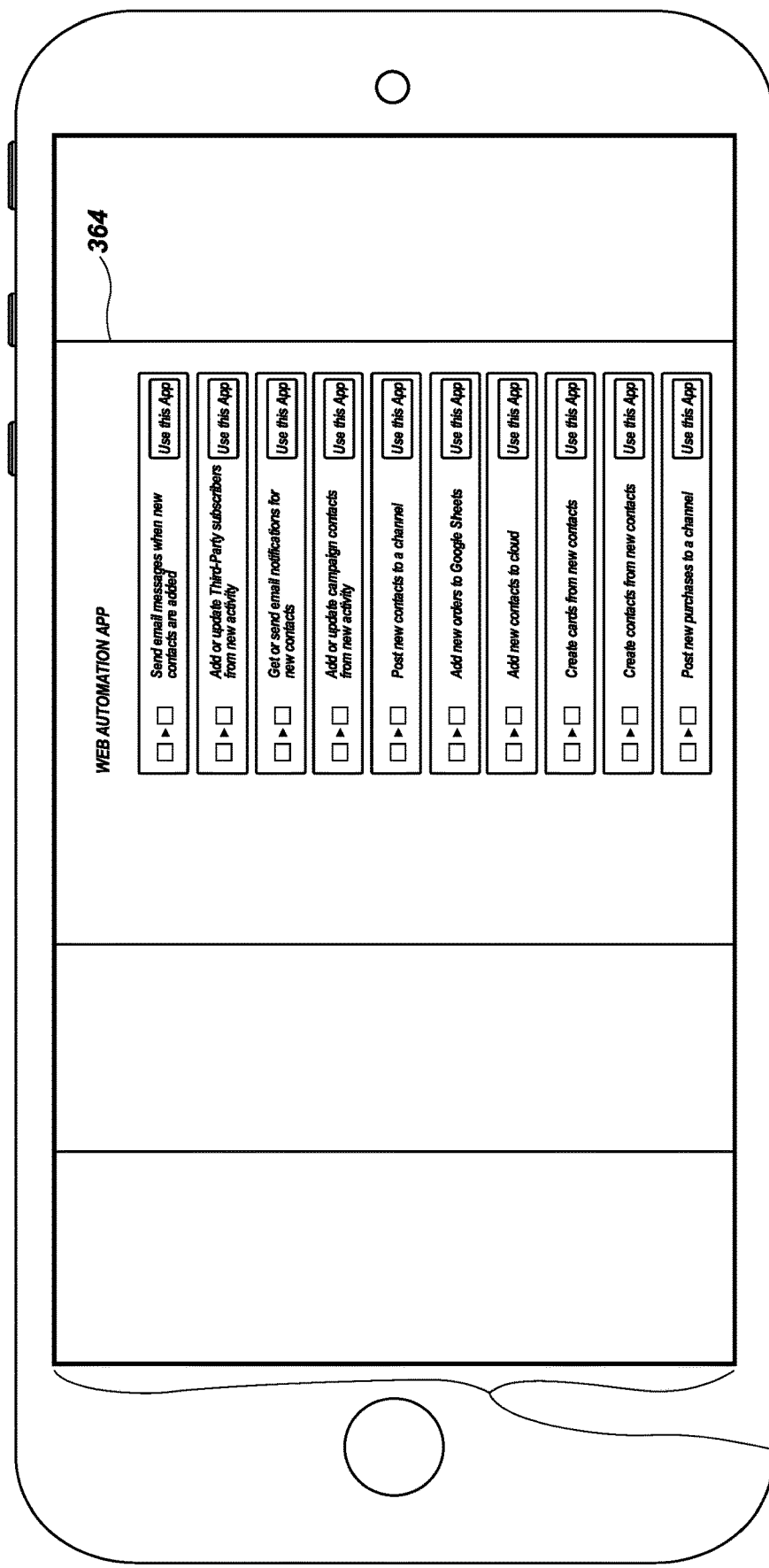
Figure 3M:
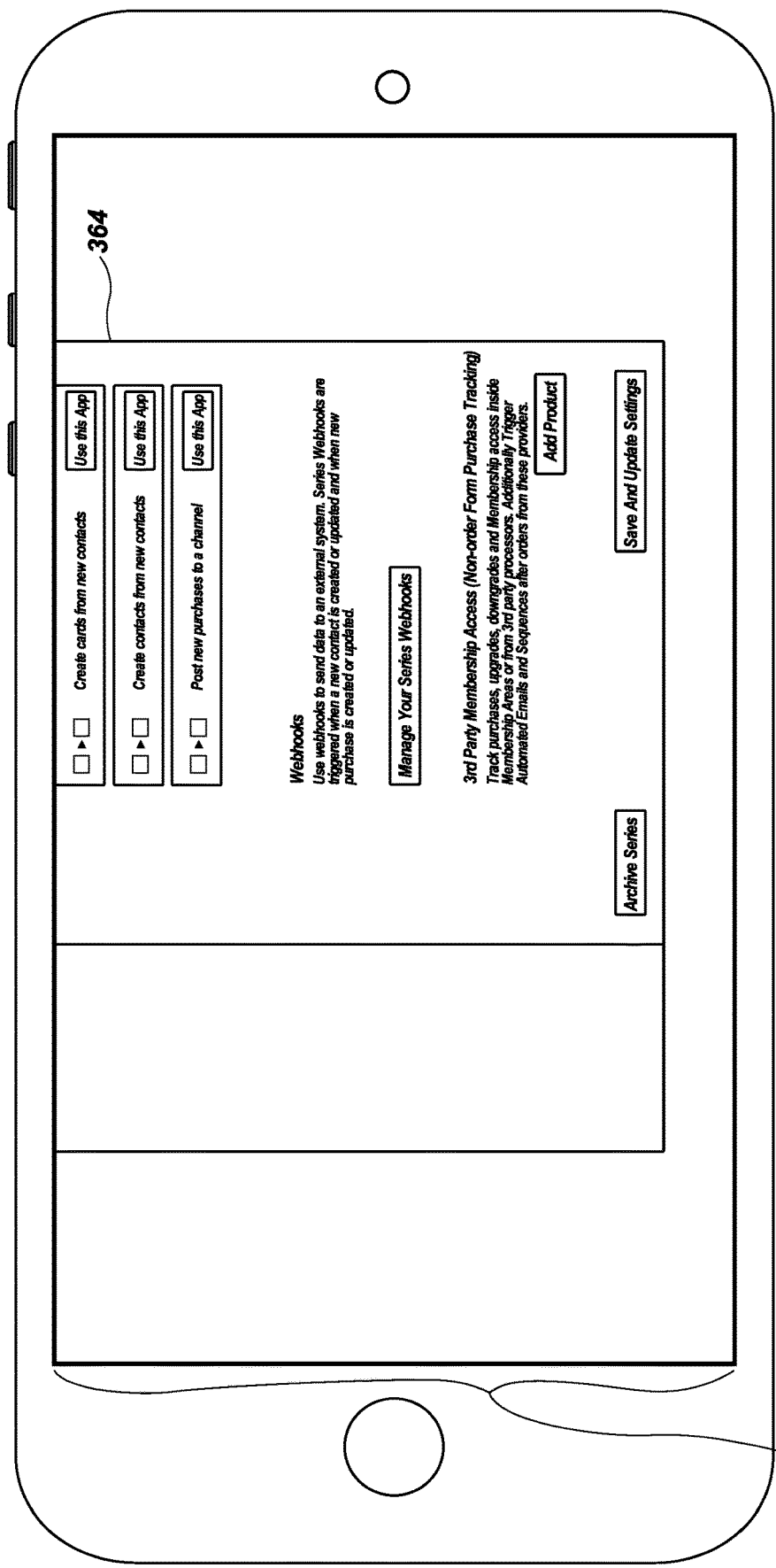

As shown in FIGS. 3K-3M, the website editor GUI 330 may further include a settings tab 364, which, when selected, may show one or more settings of the created website. Furthermore, the settings tab 364 may enable a system administrator to edit one or more of the created website's name, domain, group tag, and path, simple mail transfer protocols, favicon URLs, head tracking codes, and body tacking codes.

The settings tab 364 may further enable a system administrator to utilize web automation applications (e.g., ZAPIER®, WEBHOOKS) to automate actions related to the created website. For instance, the system administrator may utilize the settings tab 364 to set settings to cause email messages to automatically be sent to the system administrator when new contacts are added, to automatically update campaign contacts based on contacts acquired via the created website, to automatically post new contacts to an internet channel (e.g., SLACK® channel), to automatically add new contacts to a cloud storage system (e.g., GOOGLE® SHEETS), to automatically add new contacts to a cloud CRM (e.g., AGILE® CRM), to automatically create profiled cards (e.g., TRELLO® cards) from contacts, to automatically create a cloud directory (e.g., PODIO® directory of contacts) based on new contacts, and to automatically post new purchases to an internet channel (e.g., SLACK® channel). Moreover, the system administrator may utilize the settings tab 364 to set settings for automatically sending data to third-party systems. Data may be sent in response to new contacts being created or updated and when a new purchase is created or updated. Furthermore, settings tab 364 may further enable the system administrator to add third-party membership access. For example, the settings tab 364 may further enable a system administrator to give access to third parties, such as, PAYPAL®, CLICKBANK®, JVZOO™, WARRIORPLUS, etc. This may enable the system administrator to track purchases, upgrades, downgrades, and membership access from third-party processors (e.g., the third parties). Additionally, the system administrator may enable automated emails and sequences from the third parties in response to orders via the third parties.

Figure 3N:
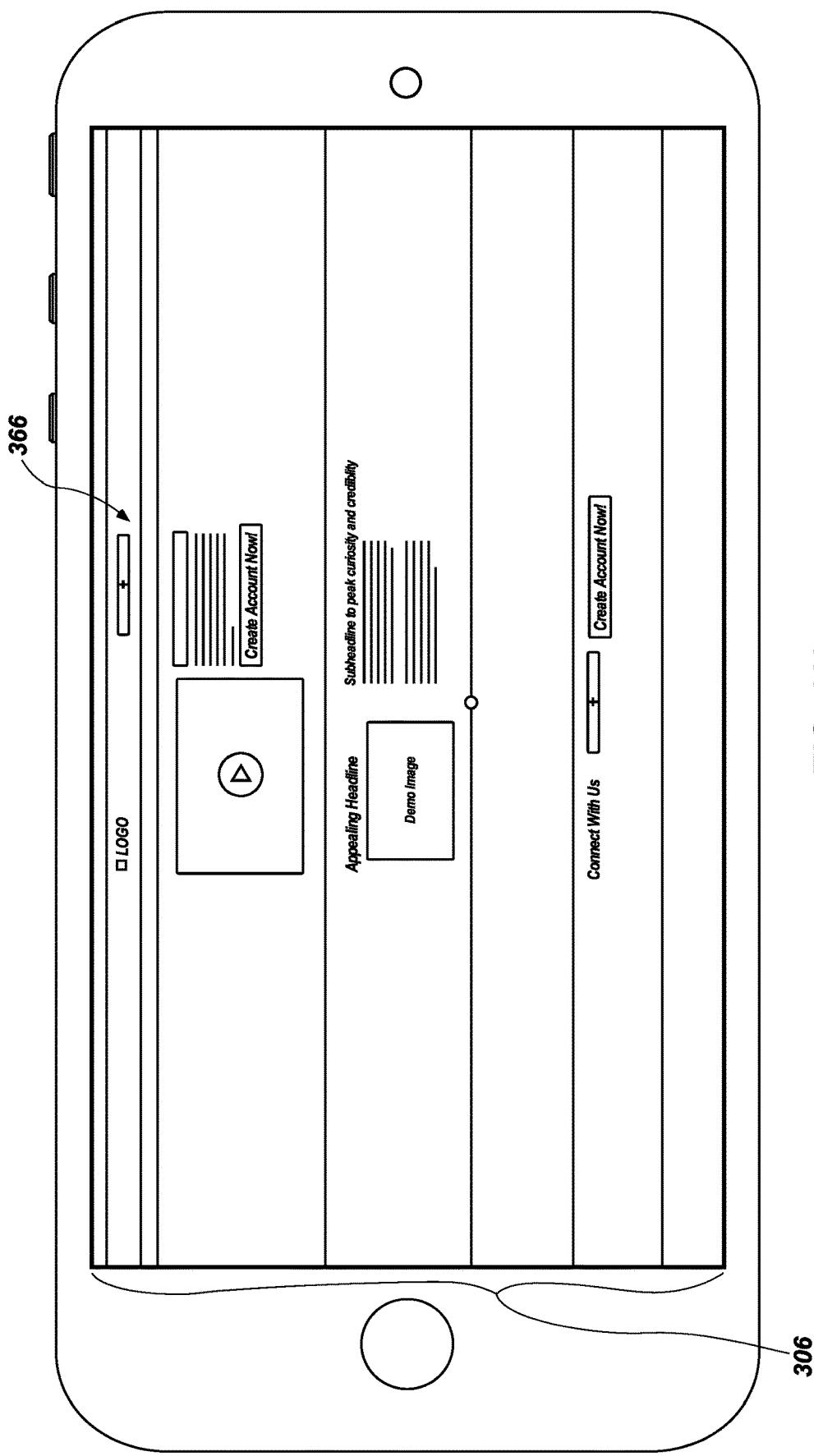

FIG. 3N shows a generic website GUI 366 generated by the website creation system 108.

Figure 4A:
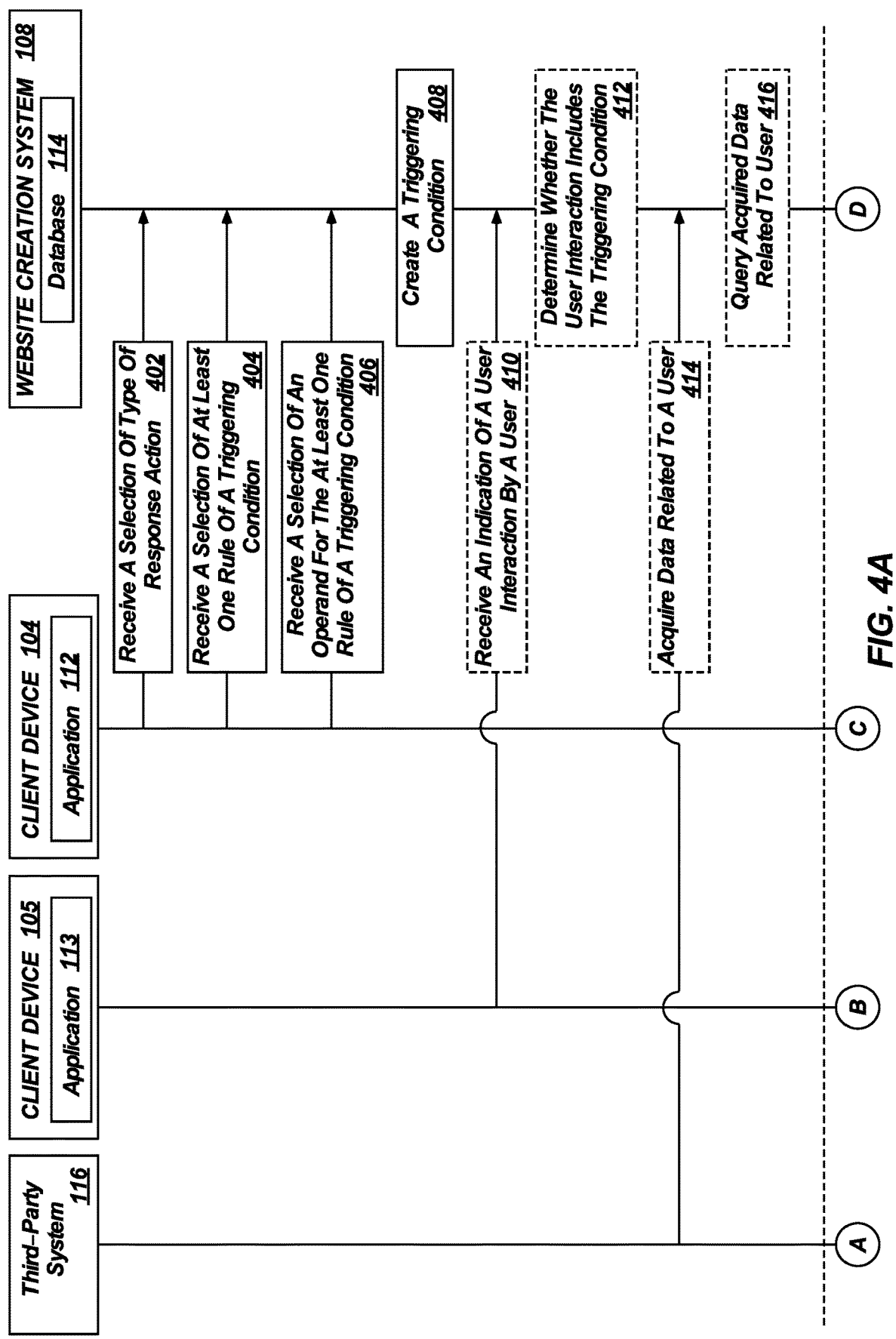
FIGS. 4A and 4B illustrate a sequence flow diagram that a website creation system can utilize to create one or more response actions in accordance with one or more embodiments of the present disclosure.
Figure 4B:
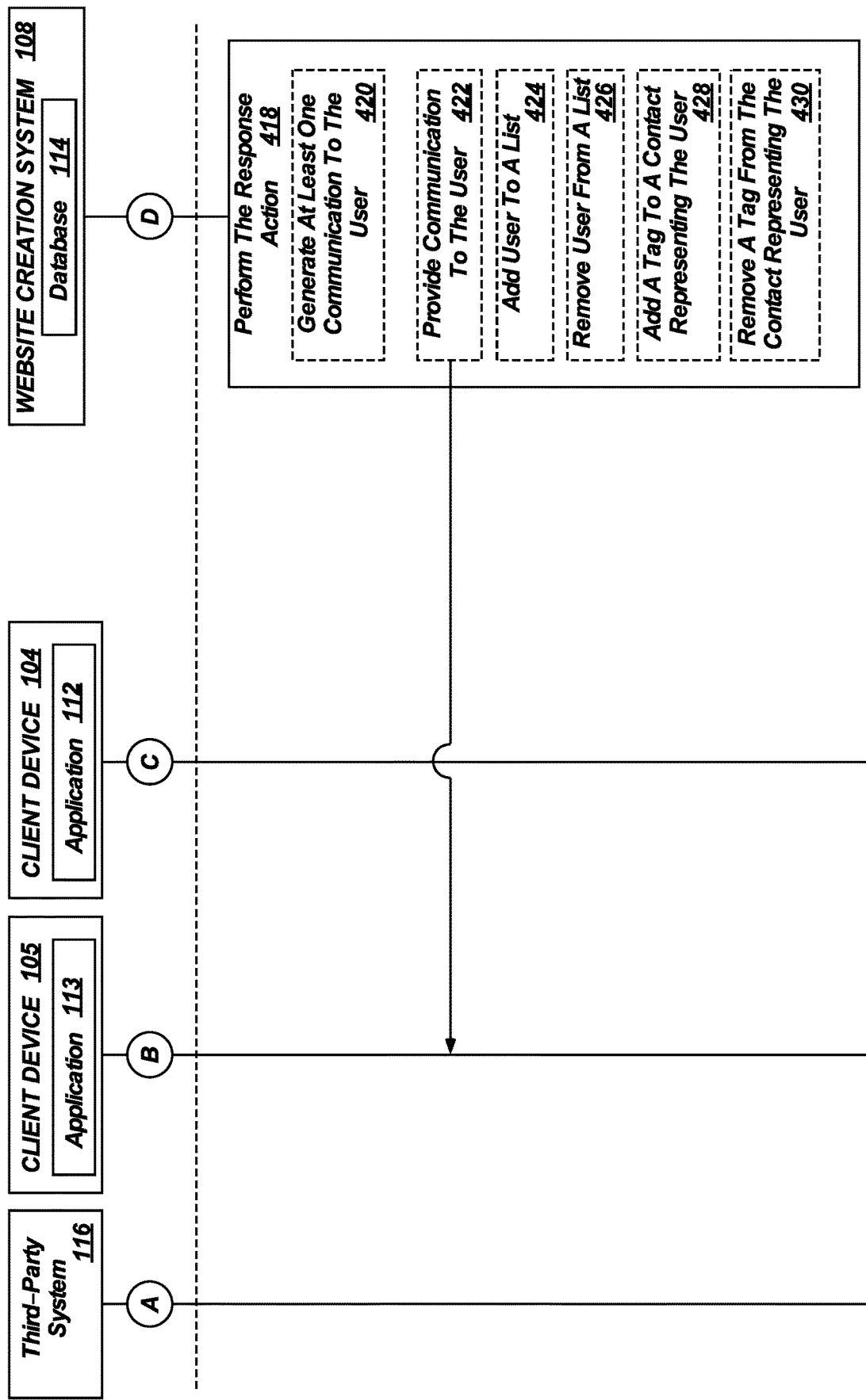

FIGS. 4A and 4B illustrate a sequence-flow diagram 200 that a website creation system 108 can utilize to create and execute response actions. For example, the website creation system 108 can utilize the sequence-flow diagram 200 to create response actions (e.g., sending a communication or adding a guest to a communication list) that are executed in response to triggering conditions (e.g., a guest makes a purchase or has a particular social media networking account). The client devices 104, 105, the third-party system 116, and the website creation system 108 shown in FIGS. 4A and 4B may be example embodiments of the client device 104, the third-party system 116, and website creation system 108 described in regard to FIG. 1.

As shown in FIG. 4A, the website creation system 108 receives a selection of a type of response action, as shown in act 402. For example, a system administrator (e.g., a user wanting to create a response action related to the user's website) can, via the client device 104 (e.g., via the application 112), select a type of response action to create via the website creation system 108. In some embodiments, the system administrator may select the type of response action via a user interface of the website creation system 108. For example, in some implementations of the present disclosure, the website creation system 108 presents, via the client device 104, one or more drop-down menus or icons representing predefined types of response actions, and the system administrator may select a predefined type of response action via the one or more drop-down menus. Additionally, the website creation system 108, via the client device 104, may detect interaction with the drop-down menus, and based on the detected interaction, may store data indicating the selected type of response action within the database 114 of the website creation system 108. Selecting a type of response action is described in greater detail below in regard to FIGS. 5A-5K.

In some embodiments, the types of response actions may include sending a communication to a guest, adding the guest to a communication list, removing the guest from a communication list, adding a tag to a contact data package (e.g., a user account (e.g., a guest member account)) representing the guest, and removing a tag from the contact data package representing the visitor. Additionally, the response actions are described in greater detail below in relation to act 418 of FIG. 4B.

Additionally, the website creation system 108 receives an indication of a selection of at least one rule of a triggering condition, as show in act 404 of FIG. 4A. For instance, the website creation system 108 may receive a selection of at least one rule of a triggering condition that, if met, will trigger the response action described above. For example, the website can, via the client device 104 (e.g., via the application 112), select at least one rule of the triggering condition via the website creation system 108. In some embodiments, the system administrator may select the at least one rule of the triggering condition via the user interface of the website creation system 108. For example, the website creation system 108 presents, via the client device 104, one or more drop-down menus or icons representing predefined rules of a triggering condition, and the system administrator may select at least one predefined rule of a triggering condition via the one or more drop-down menus. Additionally, the website creation system 108, via the client device 104, may detect interaction with the drop-down menus, and based on the detected interaction, may store data indicating the selected rule of a triggering condition within the database 114 of the website creation system 108. Manners in which the at least one rule of a triggering condition is selected are described in greater detail below in regard to FIGS. 5D and 5L.

In some embodiments, the at least one rule may include a filter (e.g., condition) that the triggering condition must meet in order to trigger the response action. In some embodiments, the at least one rule may include a rule related to a guest's social media accounts. In additional embodiments, the at least one rule may include a rule related to the guest's demographic. In further embodiments, the at least one rule may include a rule related to the guest's actions within the system administrator's website. In yet further embodiments, the at least one rule may include a rule related to whether or not the guest has made a purchase within the system administrator's website. In one or more embodiments, the at least one rule may include a rule related to whether or not the guest has interacted with a communication broadcast (e.g., an email broadcast, text message broadcast, notification broadcast, social media broadcast, an instant message broadcast, a webinar broadcast) sent or hosted from the system administrator's website. In some embodiments, the at least one rule may include a rule related to whether or not the guest is listed on a communication list (e.g., email list) related to the system administrator's website. In additional embodiments, the at least one rule may include a rule related to whether or not the guest has interacted with an email from the system administrator's website including a link to at least one page within a series of directional webpages of the website. Each of the foregoing is described in greater detail below.

As noted above, the at least one rule may include a rule related to a guest's social media accounts. For instance, the rule may relate to how many followers the guest has within a social media network, how many social media users the guest is following within a social media network, and whether or not the guest has an account within a particular social media network.

As mentioned above, the at least one rule may include a rule related to the guest's demographic and/or other labels and tags. For example, the rule may relate to the guest's name, address, location, age, gender, email address, telephone number, tags, and a recency of the most recent action performed by the guest in relation to the system administrator's website.

As also noted above, the at least one rule may include a rule related to the guest's actions within the system administrator's website. As a non-limiting example, the rule may relate to whether or not the guest has visited a particular webpage within a series of directional webpages of the system administrator's website.

As also mentioned above, the at least one rule may include a rule related to whether or not the guest has made a purchase within the system administrator's website. As a non-limiting example, the rule may relate to whether the guest has ever made a purchase on the creator's website, how many purchases the guest has made on the creator's website, how much money the guest has spent on the creator's website, and a recency of a most recent purchase.

As discussed above, the at least one rule may include a rule related to whether or not the guest has interacted with a communication broadcast (e.g., an email broadcast, a test message broadcast, a notification broadcast, a social media message broadcast, an instant message) sent from the system administrator's website. For instance, the rule may relate to whether or not the guest opened and/or viewed the communication broadcast or whether or not the guest clicked on the communication broadcast. In additional embodiments, the term "broadcast" may also refer to a webinar broadcast, and the at least one rule may relate to whether or not a guest interacted (e.g., clicked) on a webinar provided by the webinar broadcast.

As also discussed above, the at least one rule may include a rule related to whether or not the guest is listed on a list related to the system administrator's website. For example, the rule may relate to whether the guest is listed on one or more of a communication list (e.g., an email list or a communication broadcast), an opt-in list, or a static list.

Additionally, as discussed above, the at least one rule may include a rule related to whether or not the guest has interacted with an email (e.g., an email from the system administrator's website) including a link (e.g., a hyperlink) to at least one webpage within a series of directional webpages of the website. In particular, the rule may relate to whether the guest has opened an email including the link to at least one webpage within the series of directional webpages of the website. Additionally, the rule may relate to whether the guest has clicked (e.g., selected) the link within the email.

In some embodiments, each triggering condition may include a group of rules. For instance, the website creation system 108 may receive a selection of multiple rules (e.g., a group of rules) for a triggering condition. For example, the website creation system 108 may receive a selection of at least three, at least four, or at least five rules. In some instances, each one of the multiple rules may relate to different filters. In other embodiments, two or more of the multiple rules may relate to a same filter.

Referring still to FIG. 4A, in addition to receiving a selection of at least one rule of the triggering condition, the website creation system 108 receives a selection of an operand for the at least one rule of the triggering condition, as shown in act 406. For purposes of the present disclosure, the term "operand" may refer to one of the following phrases: "not applicable," "is equal to," "contains," "is greater than," "is less than," "is not blank," and "is blank."

In response to receiving the selection of the type of response action, at least one rule of the triggering condition, and an operand, the website creation system 108 creates the triggering condition, as shown in act 408 of FIG. 4A. For example, the website creation system 108 may create a data package representing the triggering condition and including each rule thereof and may store the data package within the database of the website creation system 108. Furthermore, the website creation system 108 may set the website creation system 108 to react to the triggering condition according to the at least one rule of the response action.

In some embodiments, upon creating the triggering condition, the website creation system 108 receives an indication of a user interaction by a guest with the creator's website from another client device 105 (e.g., a user device from which the guest is accessing the creator's website), as shown in act 410 of FIG. 4A. For instance, the another client device 105 may detect a user interaction by the guest via an application 113 (e.g., a web browser), and may provide an indication of the user interaction to the website creation system 108.

Furthermore, in response to receiving the indication of a user interaction by the guest, the website creation system 108 may determine whether the user interaction includes (e.g., indicates) the triggering condition, as shown in act 412 of FIG. 4A. In some embodiments, the website creation system 108 compares the user interaction to the at least one rule and operand of the triggering event. As a non-limiting example, if the rule includes that the guest must have purchased a product, the website creation system 108 may determine whether the user interaction indicates that the guest made a purchase of the product.

Additionally, in one or more embodiments, upon creating the triggering condition, the website creation system 108 acquires data (e.g., a data package) related to a guest from a third-party system 116, as shown in act 414 of FIG. 4A. As used herein, the term "acquires" may include the website creation system 108 requesting and receiving the data related to a guest from the the third-party system 116 or merely receiving the data related to a guest from the a third-party system 116.

In some embodiments, as noted above, the third-party system 116 may include one or more of a social media network, a payment processor, an email provider, etc. Furthermore, the data may include information, such as, whether the guest has an account with the social media network, a number of followers of the guest's social media account within the social media network, a number of social media accounts the guest's social media account is following, purchases made through the payment processor, whether emails from the creator's website were opened, etc.

In response to acquiring data related to a guest, the website creation system 108 may query the acquired data related to the guest, as shown in act 416 of FIG. 4A. In particular, the website creation system 108 may query the acquired data to determine whether the acquired data indicates a triggering condition. In some embodiments, the website creation system 108 compares the acquired data to the at least one rule and operand of the triggering event. As a non-limiting example, if the rule includes that the guest must have more than 100 followers on a social media network, the website creation system 108 may determine whether the acquired data indicates that the guest includes more than 100 followers on the social media network.

Upon determining that either the user interaction or the acquired data includes a triggering condition, the website creation system 108 performs the response action associated with the triggering condition, as shown in act 418 of FIG. 4B. As discussed briefly above, in some embodiments, the website creation system 108 generates at least one communication to the guest. In one or more embodiments, the website creation system 108 adds the guest to a list related the created website. In additional embodiments, the website creation system removes the guest from a list related to the created website. In further embodiments, the website creation system 108 adds a tag to a contact data package representing the guest. In yet further embodiments, the website creation system removes a tag from a contact data package representing the guest. Each of the foregoing is described in further detail below.

As mentioned above, in some embodiments, when performing the response action, the website creation system 108 generates at least one communication to the guest, as shown in act 420 of FIG. 4B. In some instances, generating at least one communication to the guest may include generating at least one of an email message, a text message (e.g., a short message service (SMS) message, a multimedia messaging service (MMS) message, an extensible messaging and presence protocol (XMPP) message, a session initiation protocol (SIP) message, an internet relay chat (IRC) message, an enhanced message service (EMS) message, an IMESSAGE® message), a notification (e.g., a notification received and displayed via the client device 105 (i.e., an operating system of the client device 105) (e.g., a push notification and/or a notification via a system bar)), instant message, or a social media message (e.g., a message through a messenger). In some embodiments, the at least one communication includes a set series of communications. For instance, the set series of communications may include at least one of a text message, an email message, a notification, and a social media network message. As another non-limiting example, the set series of communications includes at least one test message, at least one email message, at least one notification, and at least one social media network message. In some embodiments, each communication of the set series of communication may be provided to the user for display on the client device at substantially the same time. In other embodiments, each communication of the set series of communication may be provided to the user for display on the client device at different times.

In addition to generating at least one communication to the guest, the website creation system 108 provides the communication to the guest for display on the client device 105, as shown in act 422 of FIG. 4B. For example, the website creation system 108 may send the communication to the guest for display on the client device 105 or another client device (e.g., mobile phone). In some embodiments, the website creation system 108 can send the communication to the client device 105 and/or application 113 of the client device 105 via a network (e.g., a cellular network). Depending on a type of generated communication, the website creation system 108 may provide (e.g., send) the generated communication to a routing number (e.g., telephone number), a social media account, an instant messenger identifier (e.g., handle), an email account, etc.

As noted above, in one or more embodiments, when performing the response action, the website creation system 108 adds the guest to a list related the created website, as shown in act 424 of FIG. 4B. In some embodiments, adding a guest to a communication list may include adding the guest to one or more of an email list, a text message list, a notification list, a social media list, a broadcast list, or any other type of communication list. Likewise, in some embodiments, when performing the response action, the website creation system 108 removes the guest from a list, as shown in act 426 of FIG. 4B. In some instances, removing a guest from a communication list may include removing the guest from one or more of an email list, a text message list, a notification list, a social media list, a broadcast list, or any other type of communication list. In response to adding the guest to or removing the guest from a communication list, the website creation system 108 may store data representing the updated communication list with in the database 114.

As also mentioned above, in further embodiments, when performing the response action, the website creation system 108 adds a tag to a contact data package representing the guest, as shown in act 428 of FIG. 4B. Adding a tag to a contact data package representing the guest may include generating and adding any tag defined by the system administrator to the contact data representing the guest. For instance, the website creation system 108 can generate a tag and can associate the tag with the contact data package representing the guest. As used herein, the term "tag" and any derivative terms refer to associating identifying (e.g., describing) data with the saved data representing the guest. Specifically, a tag can indicate aspects (e.g., attributes) of the guest. As non-limiting examples, the tags may include "purchased," "new," "established," "Trialing," "Lead," "Prospect," etc. For example, the tags can be utilized to notify the system administrator as to the particular situation or status of the guest. For instance, the tags can be displayed within an administrator page (e.g., a contact list) within the website creation system 108. Furthermore, guests can be grouped according to tags. Likewise, in one or more embodiments, when performing the response action, the website creation system 108 can remove a tag from a data package representing a guest, as shown in act 430 of FIG. 4B. In one or more embodiments, removing a tag from a contact data package representing the guest may include removing the identifying data from the contact data package.

In response to adding or removing a tag to or from the contact data package representing the guest, the website creation system 108 can store the updated contact data package within the database 114.

FIGS. 5A-5L illustrate a collection of user interfaces including features of the website creation system 108 according to one or more embodiments of the present disclosure. In particular, the user interfaces show features of the website creation system 108. As will be described in more detail below, components of a response action creation system of the website creation system 108 as described in regard to FIGS. 4A and 4B can provide, along and/or in combination with the other components, one or more graphical user interfaces ("GUIs"). In particular, the components can allow a system administrator to interact with a collection of display elements for a variety of purposes. For instance, FIGS. 5A-5L and the description that follows illustrate various example embodiments of the user interfaces and features that are in accordance with one or more embodiments of the present disclosure.

Figure 5A:
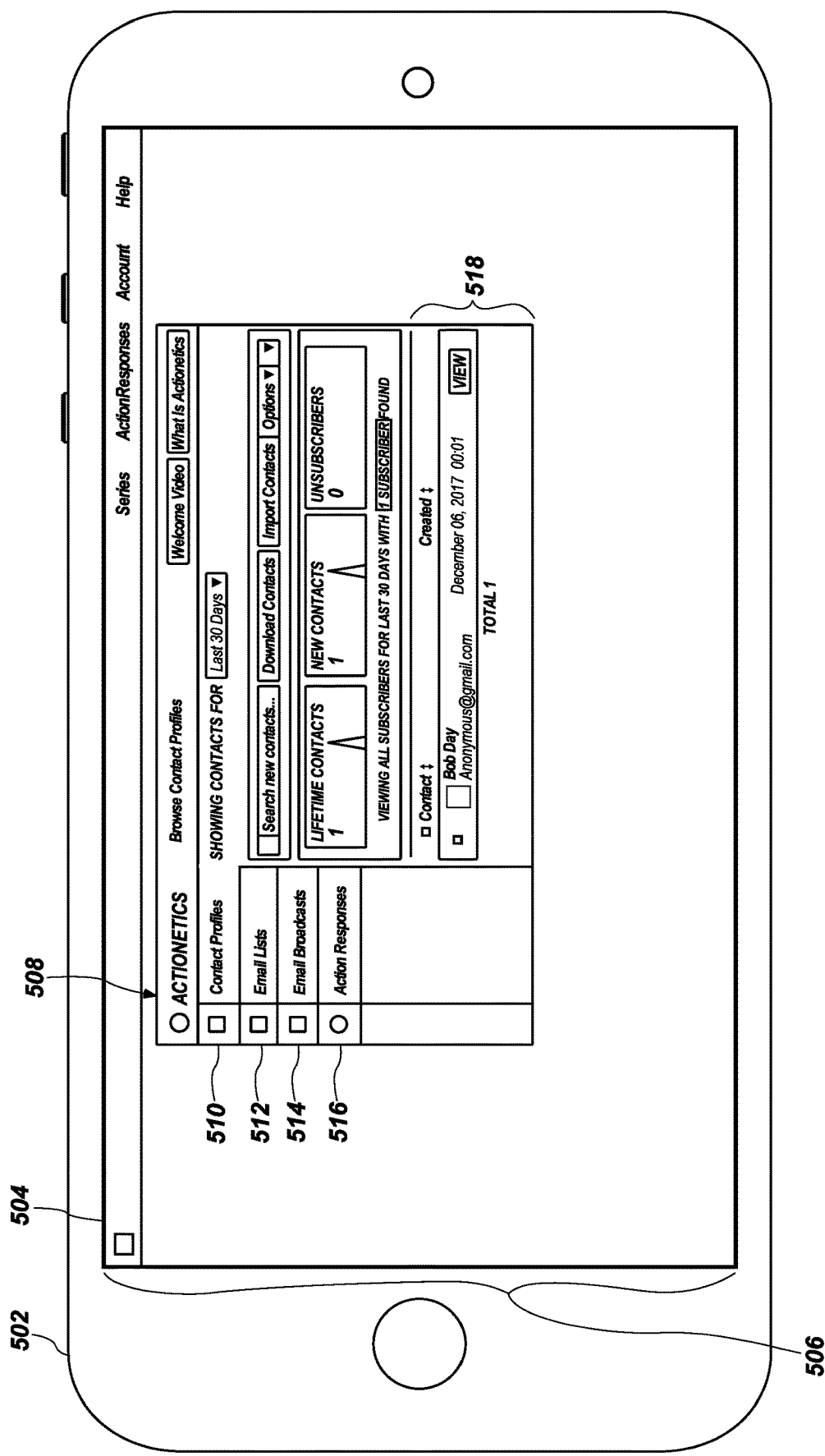
FIGS. 5A-5L illustrate a plurality of schematic representations of graphical user interfaces of the website creation system for enabling a system administrator to create one or more response actions according to one or more embodiments of the present disclosure.

For example, FIG. 5A illustrates a user device 502 that may implement one or more of the components or features of the merchant system. For purposes of the present disclosure, the user device 502 may be a client device (e.g., client device 104), such as, the user device 302 described above in regard to FIGS. 3A-3N.

The user device 502 includes a touch screen display 504 that can display user interfaces. Furthermore, the user device 502 receives and/or detects user input via the touch screen display 504. Additionally, or alternatively, the user device 502 may include any other suitable input device, such as a touch pad or those described below with reference to FIG. 6.

As shown in FIG. 5A, the touch screen display 504 of the user device 502 displays an response action creation GUI 506 (e.g., a webpage GUI) of the response action creation system provided by the website creation system 108, which, in some embodiments, can be accessible by the user device 502. Furthermore, the user device 502 (e.g., client device 104) can access the website creation system 108 and, as a result, the response action creation system via a network (e.g., network 102). As illustrated in FIG. 5A, the response action creation GUI 506 of the response action creation system can include a content window 508, a contact profile tab 510, an email list tab 512, an email broadcasts tab 514, and an action series tab 516. As will be understood by one of ordinary skill in the art, the content window 508 may display content related to which tab (e.g., the contact profile tab 510) is currently selected (e.g., highlighted). The contact profile tab 510 may provide information to a system administrator regarding current and past contacts. The email list tab 512 may enable the system administrator to create a response action in regard to contacts on an email list (e.g., an email list of contacts). The email broadcasts tab 514 may enable the system administrator to create a response action in regard to an email broadcast. The action series tab 516 may enable the system administrator to create one or more response actions in regard to communications, tags, and lists. Each of the foregoing tabs is described in greater detail below.

When the contact profile tab 510 is selected, the content window 508 may display a searchable contact list 518 of current contacts. The contact list 518 may include information, such as, for example, when a contact was creation, an email address for the contact, a name for the contact. Furthermore, the contact list 518 may further include a number of lifetime contacts (e.g., total number of current contacts), new contacts (e.g., contacts made during a particular specified period of time), and un-subscribers (e.g., lost contacts). The time period defining new contacts may be adjustable via the response action creation GUI 506.

Figure 5B:
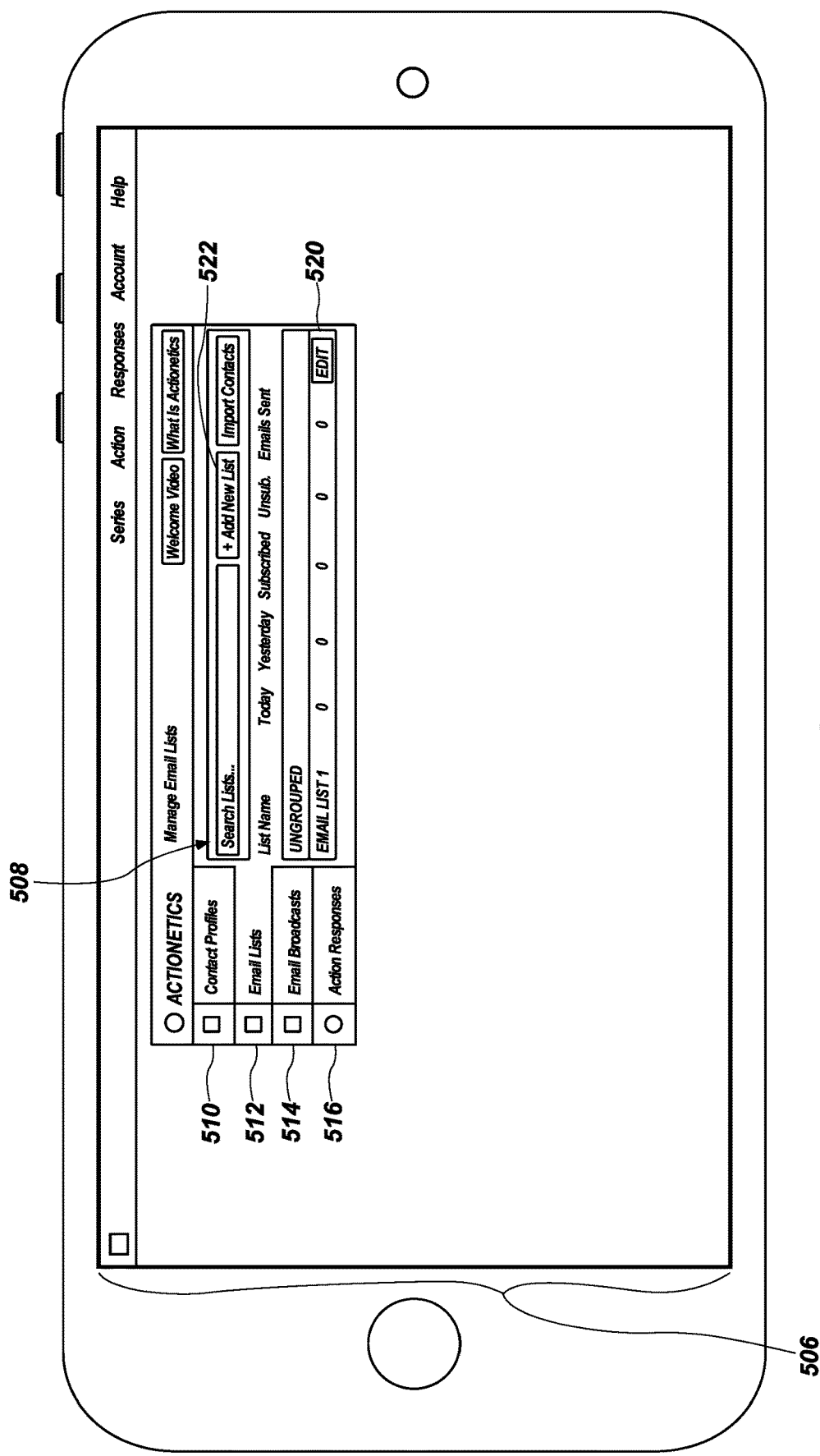
Figure 5C:
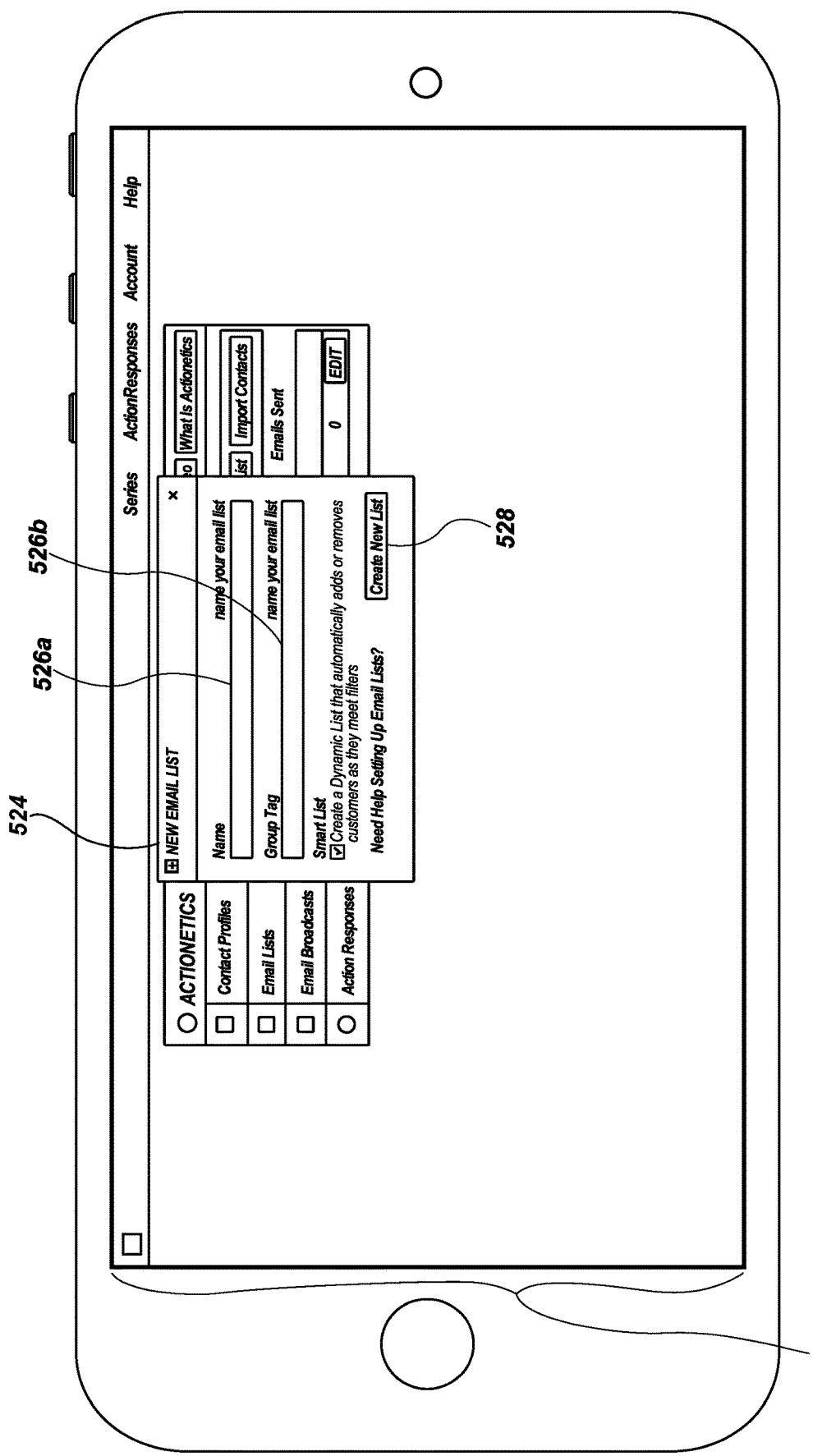

As shown in FIG. 5B, when the email list tab 512 is selected, the content window 508 may display already created email lists 520 of contacts and a selectable element 522 for creating a new list. Upon receiving a selection of the selectable element 522 for creating a new list, the response action creation GUI 506 may display a new email list window 524, which include one or more input fields 526a, 526b for inputting a name of the email list and a group tag (e.g., recent contacts) of the email list. Additionally, the new email list window 524 may include a selectable option 528 (e.g., a selectable "check box") for utilizing one or more rules (e.g., the one of more rules described above in regard to FIGS. 4A and 4B (e.g., a Smart List)) in creating the email list.

Figure 5D:
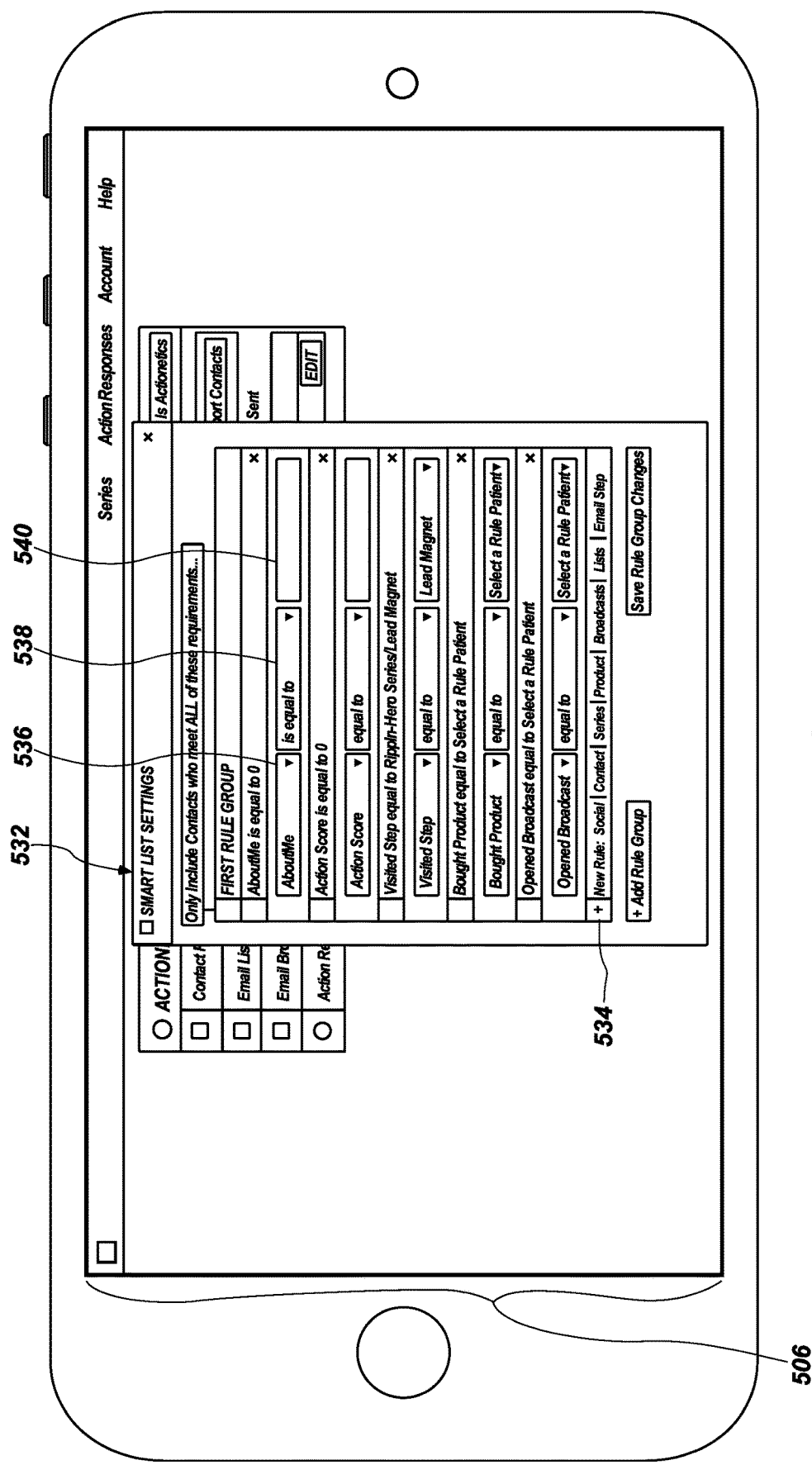

In response to receiving an input for a name and/or group tag of the email list and selecting the selectable option 528, the response action creation GUI 506 may display a rules-setting window 532 as shown in FIG. 5D. The rules-setting window 532 may include one or more rules that are customizable by the system administrator. For example, the rules setting window 532 may enable the system administrator to input (e.g., create) any of the rules described above in regard to acts 404 and 418 of FIGS. 4A and 4B. For instance, the rules-setting window 532 may include a selectable element 534 for adding a new rule, and for each added new rule, the rules-setting window 532 may include a rule-type input field 536, an operand input field 538, and an additional input field 540 for defining parameter related to the operand input field 538 (e.g., providing values when the operand includes "equal to"). In view of the foregoing, the rules may be created in any of the manners described above in regard to FIGS. 4A and 4B.

Figure 5E:
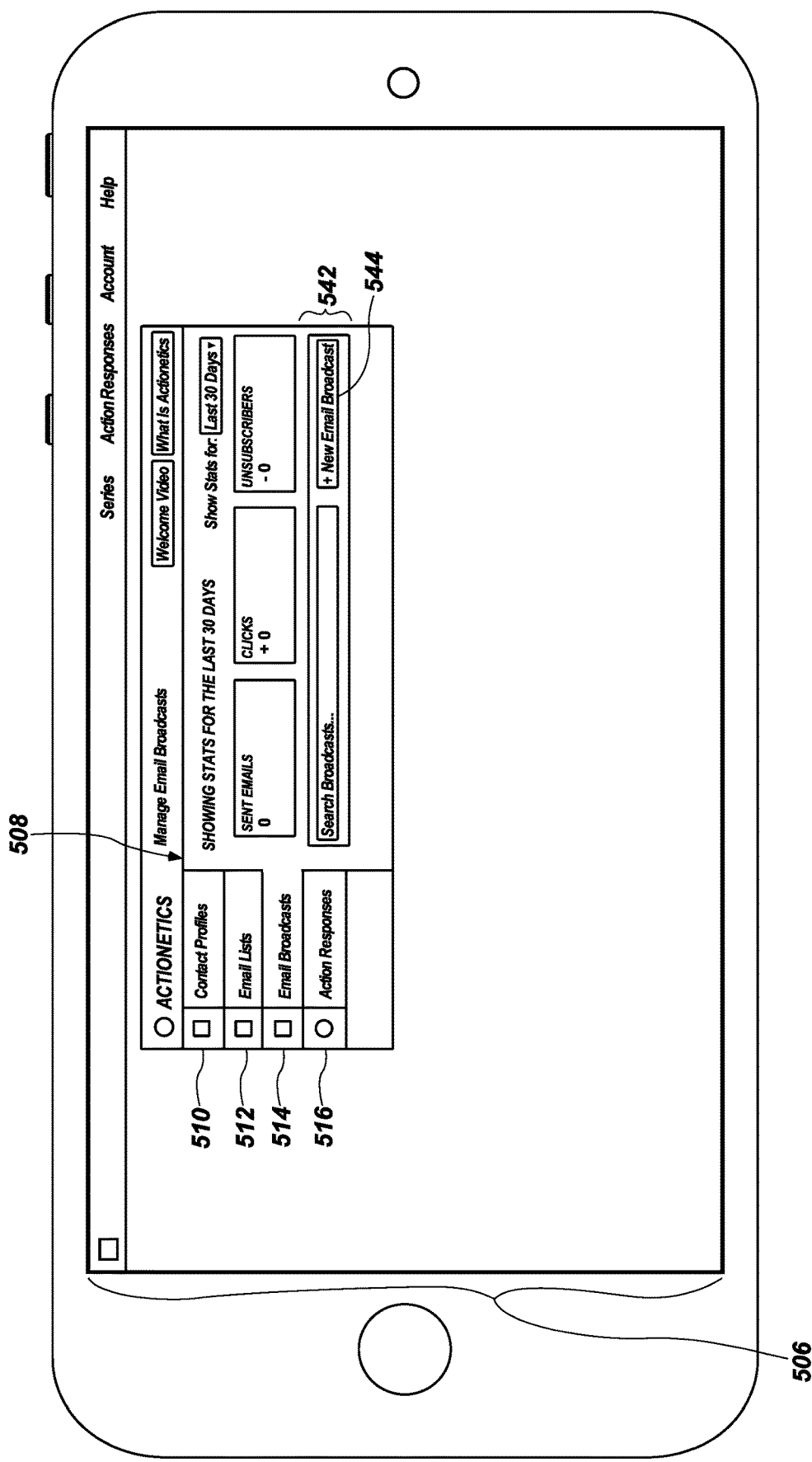

Referring to FIG. 5E, when the email broadcasts tab 514 is selected, the content window 508 may display a list 542 of previously created email broadcasts. Additionally, the email broadcasts tab 514 may show a number of emails, resulting clicks from the emails, and a number of un-subscribers from the emails. Furthermore, the email broadcasts tab 514 may include a selectable element 544 for creating a new email broadcast.

Figure 5F:
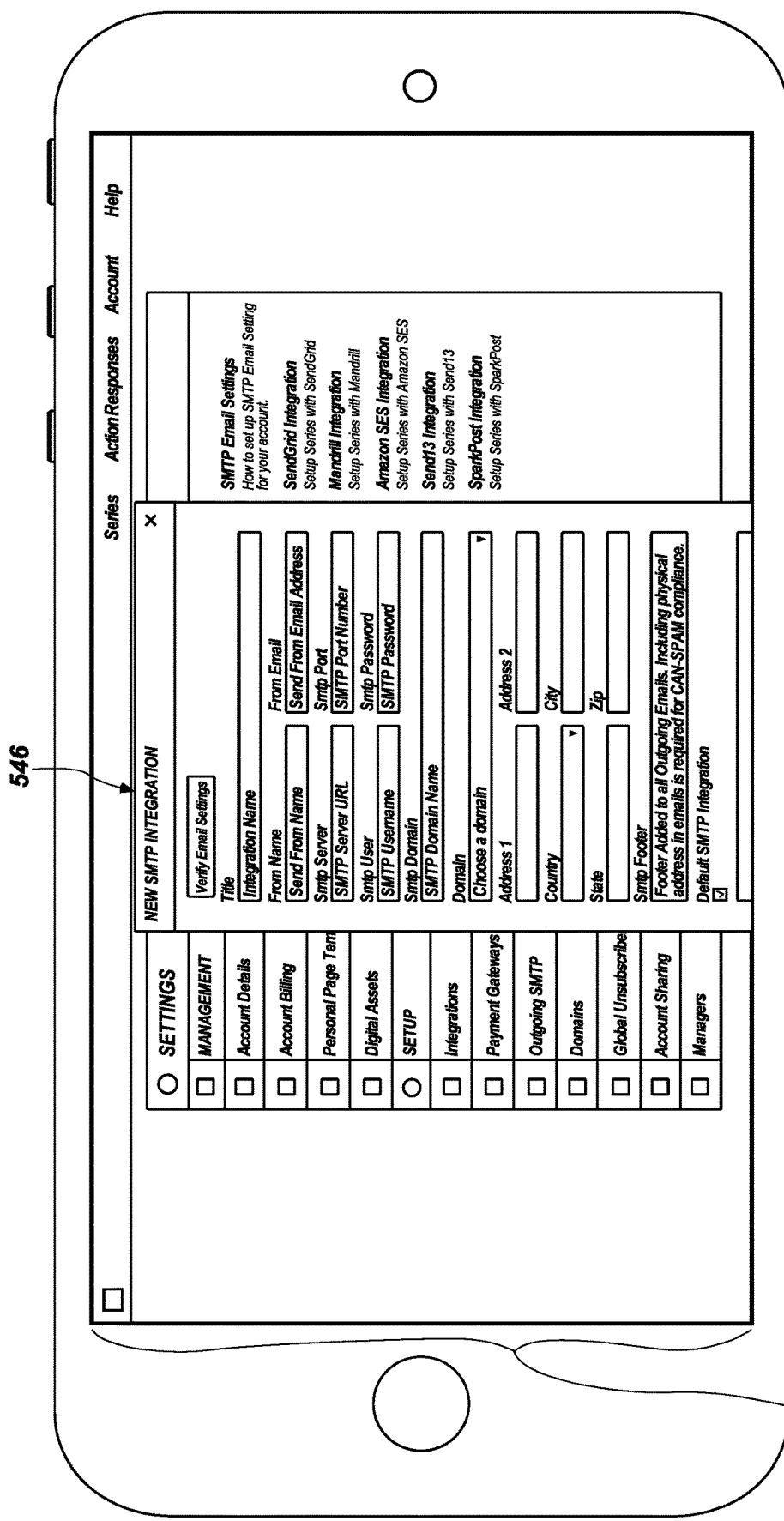
Figure 5G:
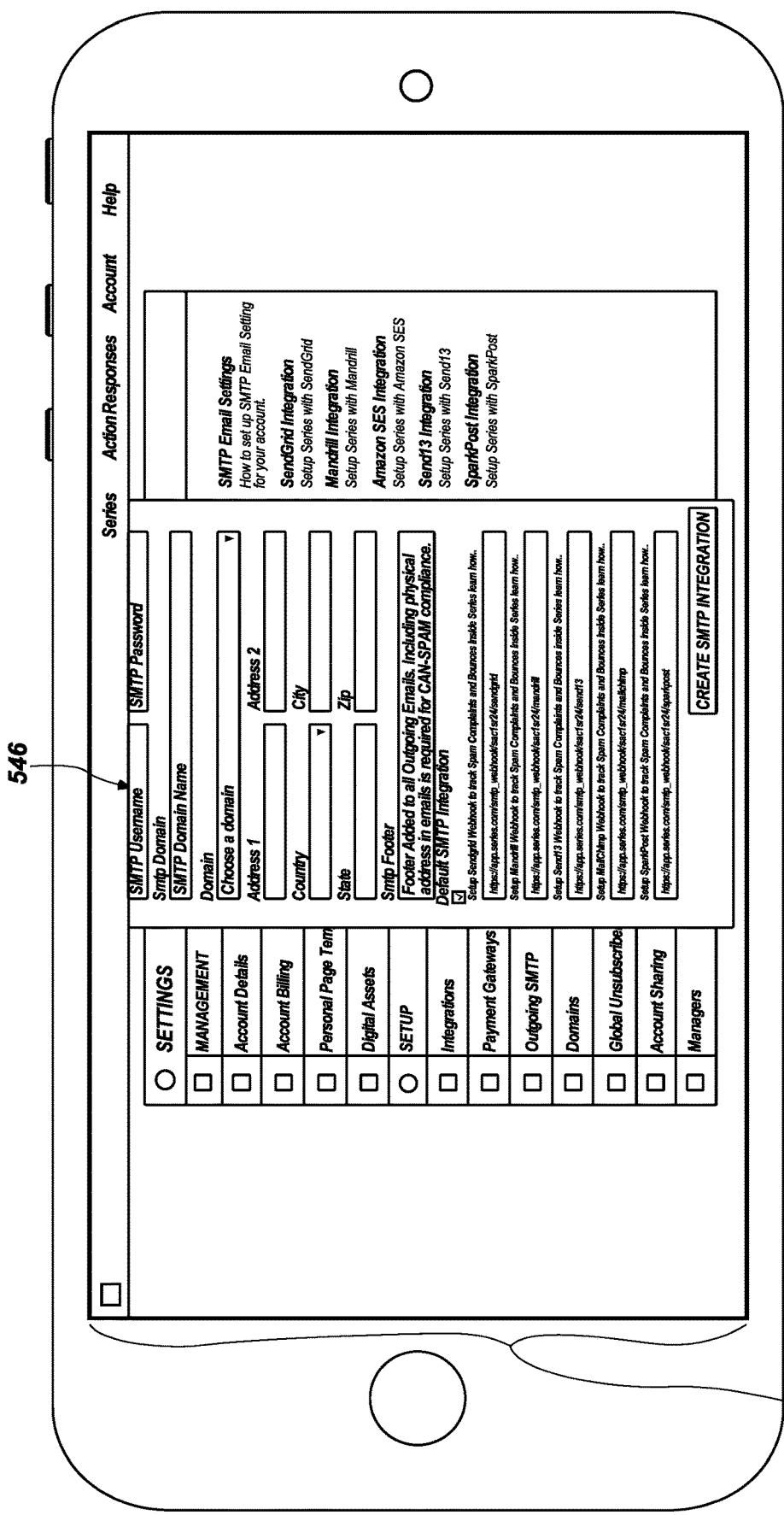

Upon receiving a selection of the selectable element 544 for creating a new email broadcast, as shown in the FIGS. 5F and 5G, the response action creation GUI 506 may display may display a simple mail transfer protocol ("SMTP") settings window 546. The SMTP settings window 546 enables the system administrator to choose/input/create SMTP settings for an email broadcast in anyway known in the art. Additionally, upon input of SMTP settings, the system administrator may create one more rules for the email broadcast in any of the manners described above in regard to FIGS. 4A, 4B, and 5D. Furthermore, although the email broadcast is described in regard to emails, the disclosure is not so limited. Rather, the email broadcast (e.g., communication broadcast) can be created for any type of communication. For example, the communication broadcast may include a text message broadcast, an instant message broadcast, a social media broadcast, a notification broadcast, etc.

Figure 5H:
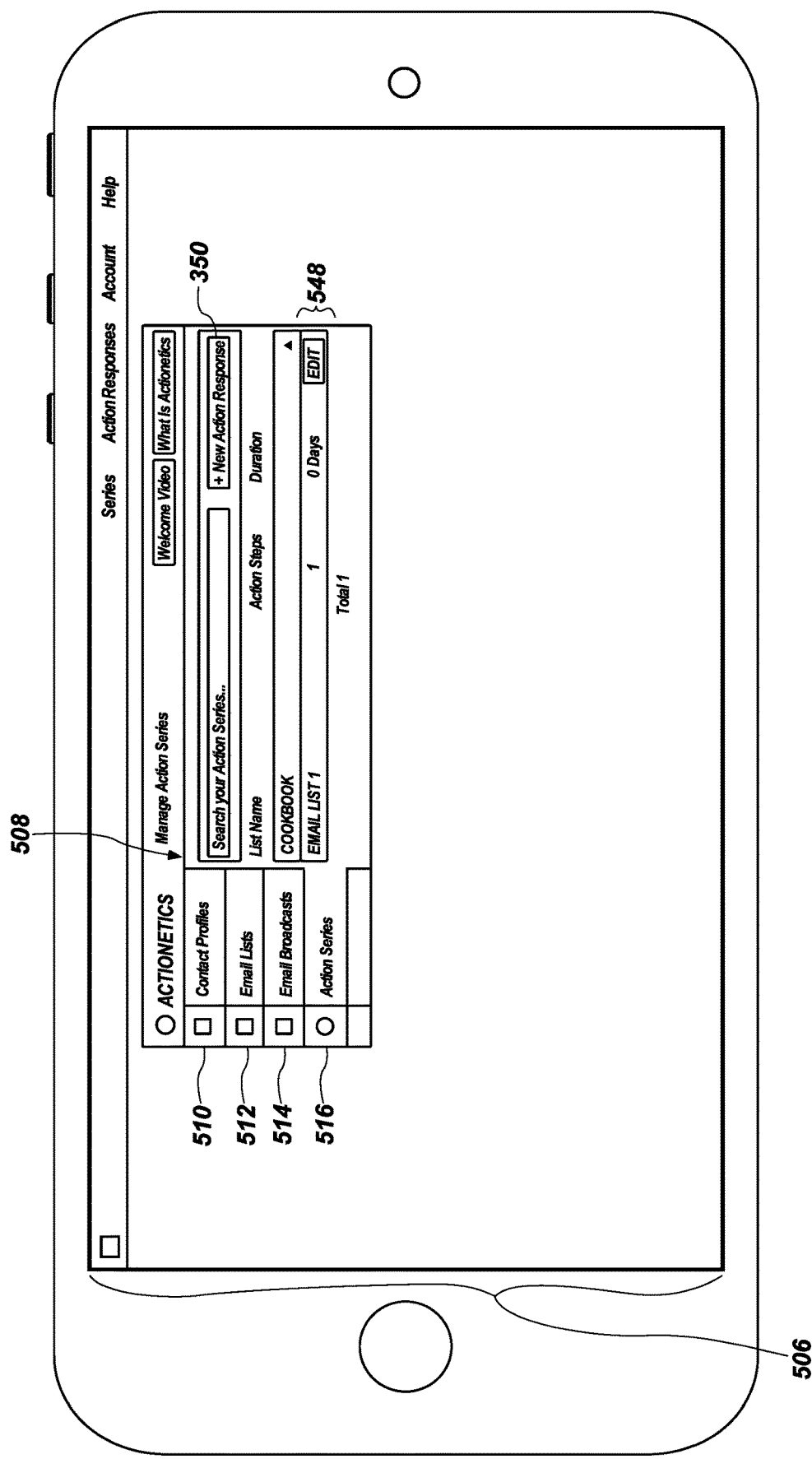
Figure 5I:
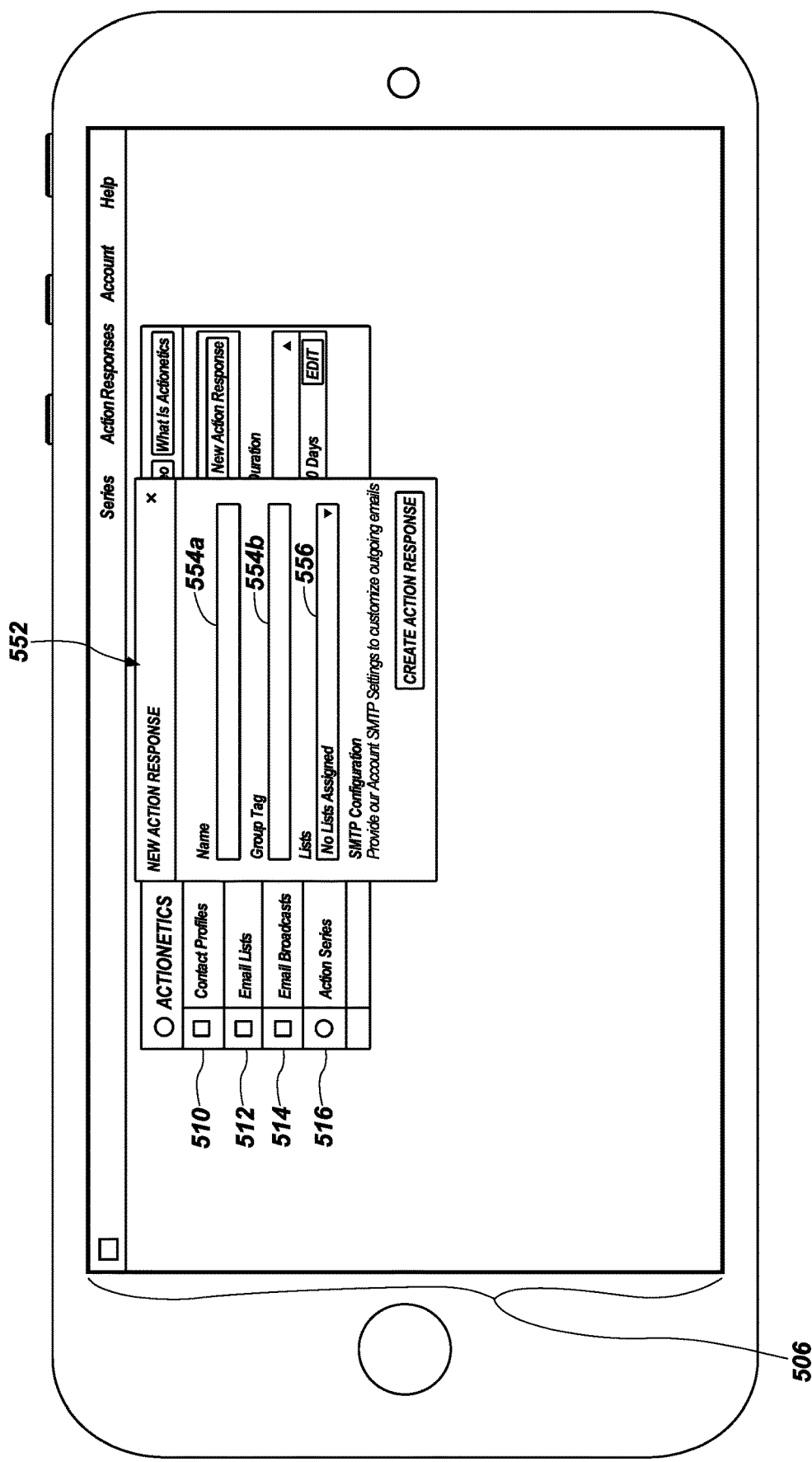

Referring to FIG. 5H, when the action series tab 516 is selected, the content window 508 displays a list 548 of already created response actions and a selectable element 350 for creation a new response action. Upon selection of the selectable element 350 for creation a new response action, the response action creation GUI 506 may display a new response action window 552, which include one or more input fields 554a, 554b for inputting a name of the response action and a group tag (e.g., recent contacts) response action. Moreover, the new response action window 552 may include an input field 556 (e.g., drop down menu) for assigning one or more communication lists (e.g., an email list) to the response action.

Figure 5J:
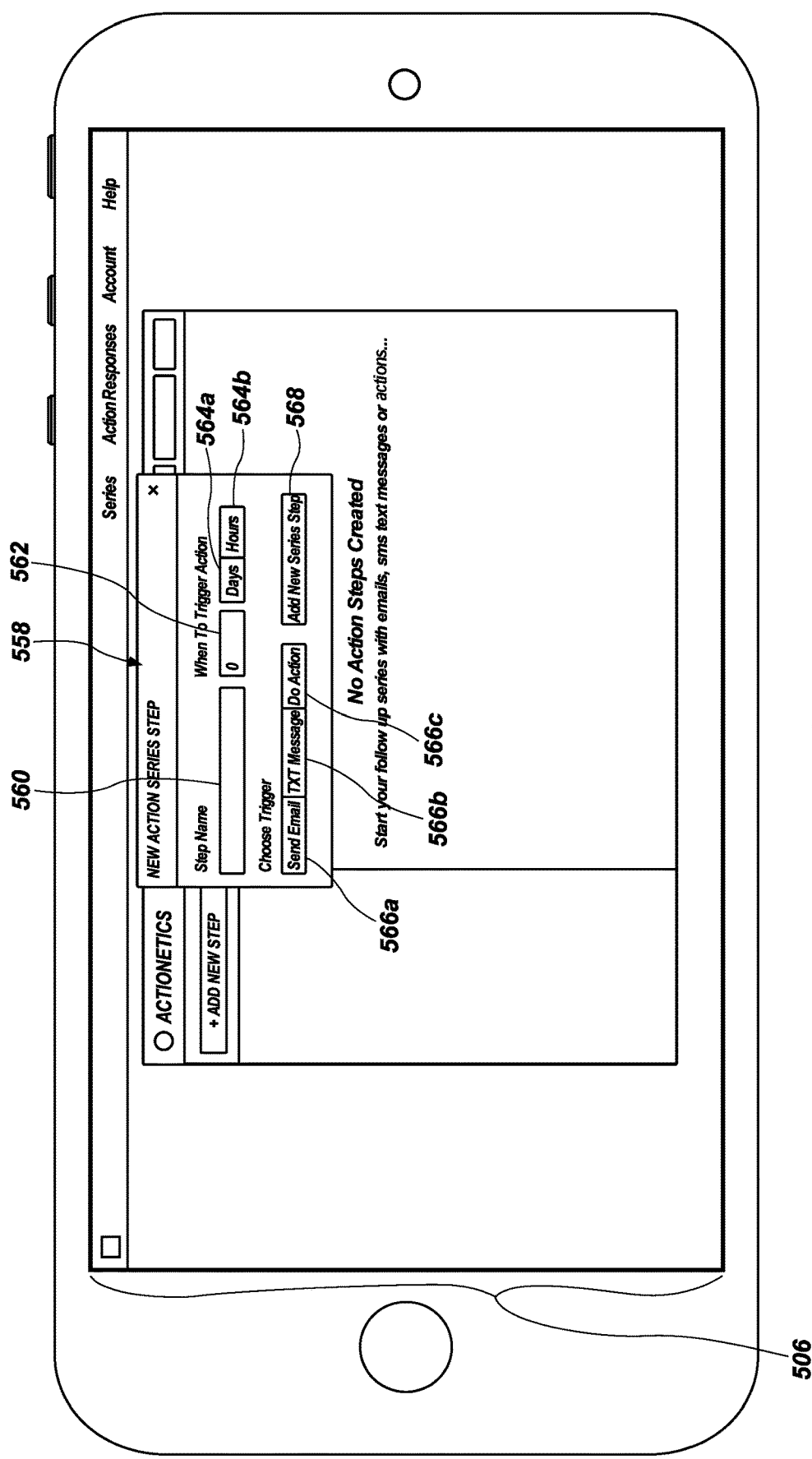

In response to receiving an input for a name, tag, and/or communication list for the new response action, the response action creation GUI 506 displays a step creation window 558, as shown in FIG. 5J. The step creation window 558 may enable a system administrator to create steps of the response action. For instance, the step creation window 558 may include an input field 560 for inputting a name of a step of the response action. Additionally, the step creation window 558 may include an input field 562 for defining how many days or hours (e.g., how much time) after a triggering condition to perform the new response action. The input field 562 may also include one or more selectable elements 564a, 564b for defining time in days or hours. Additionally, the step creation window 558 may include one or more selectable elements 566a, 566b, 566c for defining a type of response action (e.g., send email, send text message, or additional action). Likewise, the step creation window includes a selectable element 568 for adding the step to the new response action.

Figure 5K:
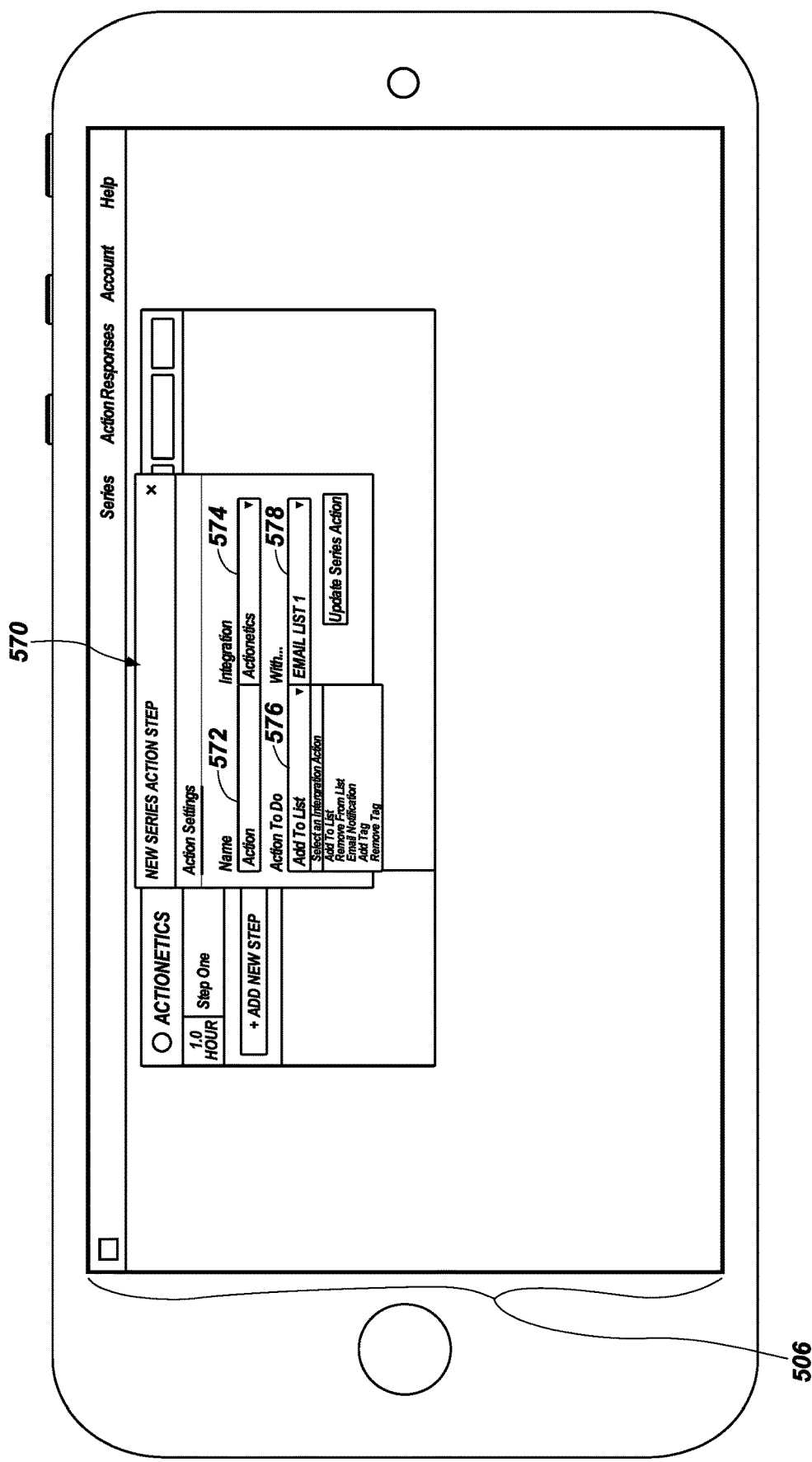

Upon receiving a selection of the selectable element 566c for an additional action type of response action, the response action creation GUI 506 displays an action definition window 570, as shown in FIG. 5K. The action definition window 570 may include a name input field 572, an integration input field 574, an "action to do" input field 576, and an option 578 to select a communication list to utilize with the new response action. The integration input field 574 may enable the system administration to utilize website creation system's 108 own integrations systems or to utilize a third-party's integration systems. The "action to do" input field 576 may include a drop down menu and may enable a system administrator to select any of the types of actions responses described above in regard to acts 402, 404, and 418 of FIGS. 4A and 4B.

Figure 5L:
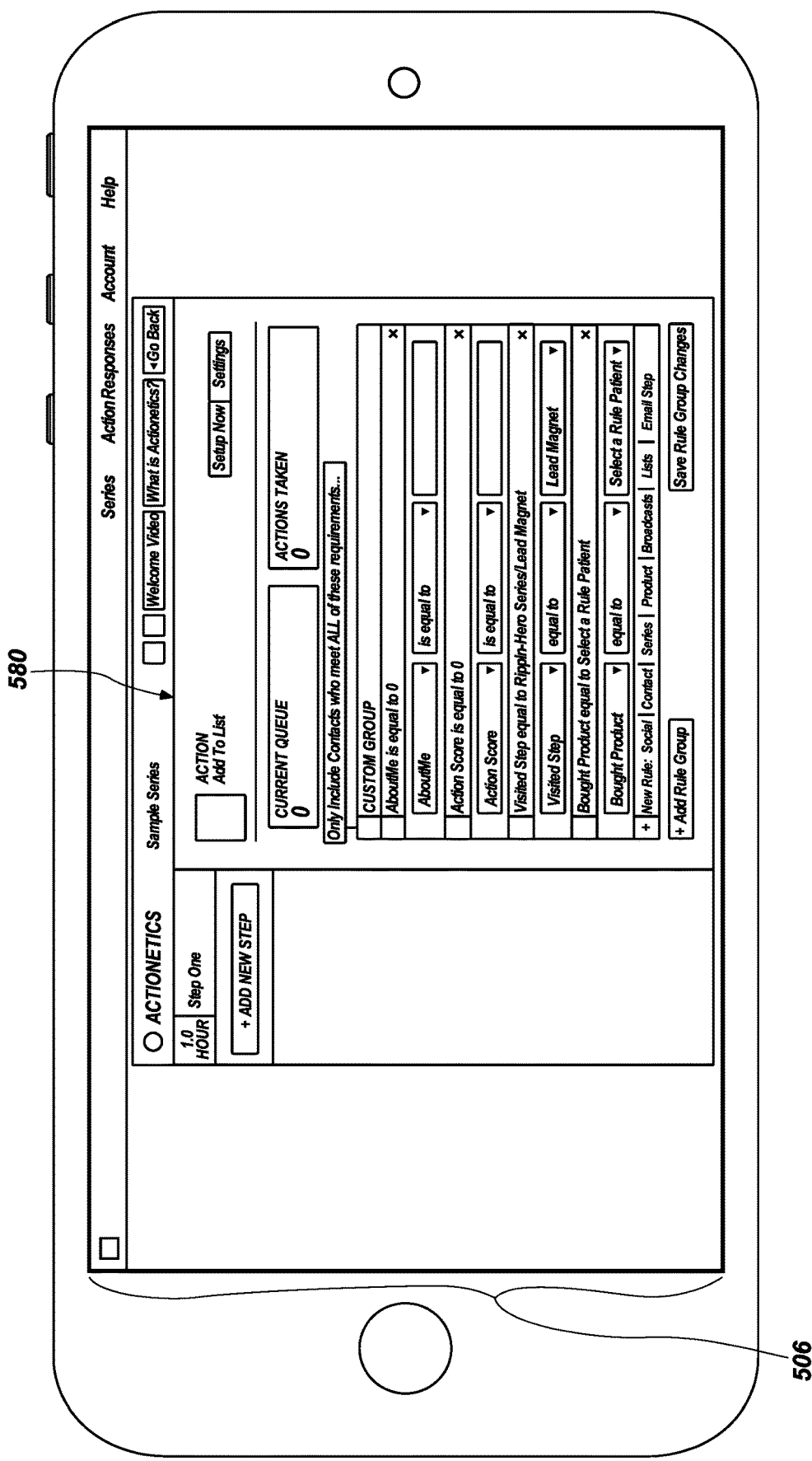

Upon receiving a selection for a type of response action from either the step creation window 558 of FIG. 5J or the action definition window 570 of FIG. 5K, the response action creation GUI 506 displays rules definition window 580 specific to the type of selected response action, as shown in FIG. 5L. Rules for to the type of selected response action may be defined (e.g., defined by a system administrator) in any of the manners described above in regard to acts 402-406 and 418 of FIGS. 4A and 4B and FIG. 5D.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
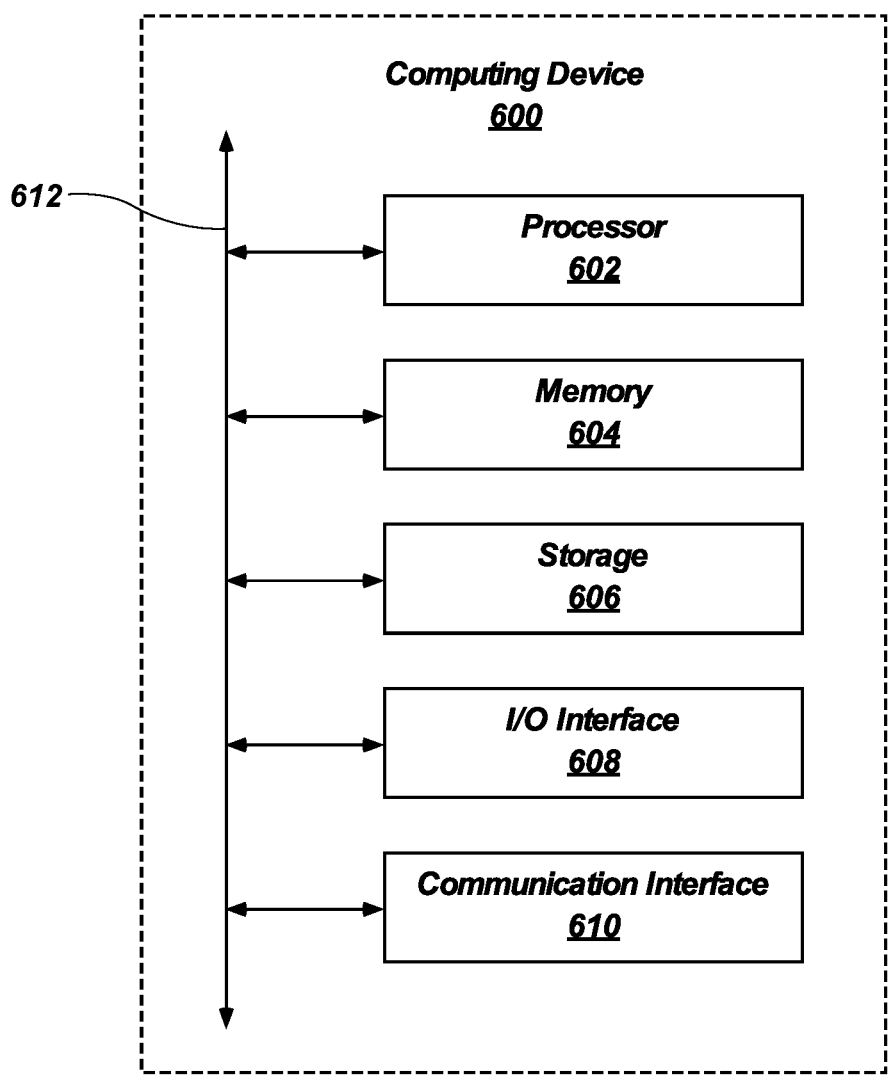
FIG. 6 illustrates a block diagram of an example computing device in accordance with one or more embodiments of the present disclosure.

FIG. 6 illustrates a block diagram of an example computing device 600 that may be configured to perform one or more of the processes described above. One will appreciate that one or more computing devices such as the computing device 600 may implement the website creation system 108. As shown by FIG. 6, the computing device 600 can comprise a processor 602, a memory 604, a storage device 606, an I/O interface 608, and a communication interface 610, which may be communicatively coupled by way of a communication infrastructure. While an example computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In one or more embodiments, the processor 602 includes hardware for executing instructions, such as those making up a computer program. As an example, and not by way of limitation, to execute instructions, the processor 602 may retrieve (or fetch) the instructions from an internal register, an internal cache, the memory 604, or the storage device 606 and decode and execute them. In one or more embodiments, the processor 602 may include one or more internal caches for data, instructions, or addresses. As an example, and not by way of limitation, the processor 602 may include one or more instruction caches, one or more data caches, and one or more translation look aside buffers (TLBs). Instructions in the instruction caches may be copies of instructions in the memory 604 or the storage device 606.

The computing device 600 includes memory 604, which is coupled to the processor(s) 602. The memory 604 may be used for storing data, metadata, and programs for execution by the processor(s). The memory 604 may include one or more of volatile and non-volatile memories, such as Random-Access Memory ("RAM"), Read Only Memory ("ROM"), a solid state disk ("SSD"), Flash, Phase Change Memory ("PCM"), or other types of data storage. The memory 604 may be internal or distributed memory.

The computing device 600 includes a storage device 606 that includes storage for storing data or instructions. As an example, and not by way of limitation, storage device 606 can comprise a non-transitory storage medium described above. The storage device 606 may include a hard disk drive (HDD), a floppy disk drive, Flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In one or more embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or Flash memory or a combination of two or more of these.

The computing device 600 also includes one or more input or output ("I/O") devices/interfaces 608, which are provided to allow a user to provide input to, receive output from, and otherwise transfer data to and receive data from computing device 600. The I/O devices/interfaces 608 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The computing device 600 can further include a communication interface 610. The communication interface 610 can include hardware, software, or both. The communication interface 610 can provide one or more interfaces for communication (such as, for example, packet-based communication) between the computing device 600 and one or more other computing devices or networks. As an example, and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI. The computing device 600 can further include a bus 612. The bus 612 can comprise hardware, software, or both that couples components of computing device 600 to each other.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present disclosure further includes the following embodiments.

Embodiment 1. A method comprising; receiving, from a client device, a selection of a type of response action, the response action to be performed in response to a triggering condition; receiving a selection of at least one rule of the triggering condition; receiving a selection of an operand for the at least one rule of the triggering condition; creating the triggering condition; and in response to receiving an indication that the triggering condition has occurred, performing the response action.

Embodiment 2. The method of embodiment 1, further comprising: receiving, from another client device, an indication of a user interaction by a guest within a website; determining whether the user interaction includes the triggering condition; querying acquired data related to the guest; determining whether the acquired data related to the guest indicates the triggering condition; upon determining that the user interaction includes the triggering condition or that the data related to the guest indicates the triggering condition, generating at least one communication to the guest; providing the at least one communication to the guest for display on another client device.

Embodiment 3. The method of embodiment 2, wherein the at least one communication comprises a set series of communications.

Embodiment 4. The method of embodiment 3, wherein the set series of communications includes at least one of a text message, an email message, a notification, and a social media network message.

Embodiment 5. The method of embodiment 3, wherein the set series of communications includes at least one test message, at least one email message, at least one notification, and at least one social media network message.

Embodiment 6. The method of embodiment 3, wherein each communication of the set series of communication is provided to the guest for display on the another client device at substantially the same time.

Embodiment 7. The method of embodiment 3, wherein each communication of the set series of communication is provided to the guest for display on the another client device at different times.

Embodiment 8. A system comprising: at least one processor; and at least one non-transitory computer-readable storage medium storing instructions thereon that, when executed by the at least one processor, cause the system to: receive, from a client device, a selection of a type of response action, the response action to be performed in response to a triggering condition; receive a selection of at least one rule of the triggering condition; receive a selection of an operand for the at least one rule of the triggering condition; create the triggering condition; and in response to receiving an indication that the triggering condition has occurred, perform the response action.

Embodiment 9. The system of embodiment 8, wherein the at least one rule of the triggering condition includes at least one of the guest having social media networking account, the guest having a particular demographic, the guest completing an opt-in on a website, the guest purchasing a product on the website, the guest opening a communication broadcast, and the guest being on an email list.

Embodiment 10. The system of embodiment 8, wherein the operand include one of is equal to, contains, is greater than, is less than, is not blank, and is blank.

Embodiment 11. The system of embodiment 8, wherein the at least one rule of the triggering condition includes multiple rules.

Embodiment 12. The system of embodiment 8, thereon that, when executed by the at least one processor, cause the system to: receive, from another client device, an indication of a user interaction by a guest within a website; query acquired data related to the guest; determine whether the user interaction includes the triggering condition; determine whether the acquired data related to the guest indicates the triggering condition; upon determining that the user interaction includes the triggering condition or that the data related to the guest indicates the triggering condition, generate at least one communication to the guest; provide the at least one communication to the guest for display on the another client device.

Embodiment 13. The system of embodiment 12, further comprising instructions thereon that, when executed by the at least one processor, cause the system to provide a particular type of communication based on a type of triggering condition.

Embodiment 14. The system of embodiment 12, further comprising instructions thereon that, when executed by the at least one processor, cause the system to acquire the data related to the guest from a third party system.

Embodiment 15. The system of embodiment 15, wherein the third party system comprises a social media network.

Embodiment 16. The system of embodiment 12, wherein the response action comprises one of sending a communication to the guest, adding the guest to a communication list; removing the guest from a communication list, adding tag to a contact data package representing the guest, and removing a tag from a contact representing the guest.

Embodiment 17. A non-transitory computer-readable medium storing instructions thereon that, when executed by at least one processor, cause the at least one processor to perform steps comprising: receiving, from a client device, a selection of a type of response action, the response action to be performed in response to a triggering condition; receiving a selection of at least one rule of the triggering condition; receiving a selection of an operand for the at least one rule of the triggering condition; creating the triggering condition; and in response to receiving an indication that the triggering condition has occurred, performing the response action.

Embodiment 18. The non-transitory computer-readable medium of embodiment 17, further comprising instructions thereon that, when executed by at least one processor, cause the processor to further perform steps of: receiving, from another client device, an indication of a user interaction by a guest with a website; determining whether the user interaction includes the triggering condition; querying acquired data related to the guest; determining whether the acquired data related to the guest indicates the triggering condition; upon determining that the user interaction includes the triggering condition or that the data related to the guest indicates the triggering condition, generating at least one communication to the guest; providing the at least one communication to the guest for display on the another client device.

Embodiment 19. The non-transitory computer-readable medium of embodiment 17, wherein the at least one rule of the triggering condition includes at least one of the guest having social media networking account, the guest having a particular demographic, the guest completing an opt-in on a website, the guest purchasing a product on the website, the guest opening a communication broadcast, and the guest being on an email list.

Embodiment 20. The non-transitory computer-readable medium of embodiment 17, wherein the response action comprises one of sending a communication to the guest, adding the guest to a communication list; removing the guest from a communication list, adding tag to a contact data package representing the guest, and removing a tag from a contact representing the guest.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the content features described, may become apparent to those skilled in the art from the description. Such modifications and embodiments are also intended to fall within the scope of the appended claims and legal equivalents.

We claim:

1. A method, comprising:
providing a website editor graphical user interface for display to a user;
receiving a selection from a user to create a website from the displayed website graphical user interface;
providing a plurality of website types to the user, each website type of the plurality of website types comprising a unique plurality of webpages configured to be provided to an end user, wherein the website types may comprise one or more of: a presale page category; an opt-in page category; a thank you page category; a sales page category; an upsell page category; an order forms category; a webinar page category; a membership page category; or an affiliate page category;
receiving a selection of a website type from the plurality of website types from the user;
receiving a selection from a settings tab of the graphical user interface for enabling the user to utilize web automation applications to automate actions related to the created website;
providing a plurality of website templates particular to the selected website type to the user;
receiving a selection of a website template from the plurality of website templates from the user; and
automatically generating and launching a generic website specific to the selected website template with integrated web automation applications.

2. A cloud computing platform comprising:
at least one processor; and
at least one non-transitory computer-readable storage medium storing instructions thereon that, when executed by the at least one processor, cause the cloud computing platform to:
provide a website editor graphical user interface for display to a user;
receive a selection to create a website from the displayed website graphical user interface;
provide a plurality of website types to the user, each website type of the plurality of website types comprising a unique plurality of webpages, wherein the website types may comprise one or more of: a presale page category; an opt-in page category; a thank you page category; a sales page category; an upsell page category; an order forms category; a webinar page category; a membership page category; or an affiliate page category;
receive a selection from a settings tab of the graphical user interface for enabling the user to utilize web automation applications to automate actions related to the created website;
provide a plurality of website templates particular to the selected website type to the user;
receive a selection of a website template from the plurality of website templates from the user;
automatically generate and launch a generic website specific to the selected website with integrated web automation applications; and.

3. The cloud computing platform of claim 2, wherein the selection to create a website is received from an administrator device.

4. The method of claim 1, wherein the presale page category comprises survey pages, article pages, presale pages, and click pop pages.

5. The method of claim 1, wherein the opt-in page category comprises squeeze pages, reverse squeeze pages, lead magnets, and coupons.

6. The method of claim 1, wherein the thank you page category comprises thank you pages, offer walls, bridge pages, and share pages.

7. The method of claim 1, wherein the sales page category comprises video sales pages, sales letter pages, and product launch pages.

8. The method of claim 1, wherein the order forms category comprises two-step order pages, traditional order pages, video sales letter order pages, sales letter order pages, and product launch pages.

9. The method of claim 1, wherein the webinar page category comprises webinar registration pages, webinar confirmation pages, webinar broadcast rooms, and webinar replay rooms.

10. The method of claim 1, wherein the plurality of website templates comprises varying orientations, color schemes, drop in areas, animations, and graphics that are specific to the selected website type.

11. The method of claim 1, wherein the step of automatically generating and launching a generic website specific to the selected website template further comprises providing the generic website to a third-party hosting system.

12. The method of claim 1, further comprising, in response to receiving the indication of at least one user interaction editing at least one webpage of the website, editing the launched website according to the user interaction to create a customized website.

* * * * *